(12) United States Patent
Gonzalez

(10) Patent No.: US 11,085,488 B2
(45) Date of Patent: Aug. 10, 2021

(54) TILTING PAD BEARING ASSEMBLIES, AND BEARING APPARATUSES AND METHODS OF USING THE SAME

(71) Applicant: US SYNTHETIC CORPORATION, Orem, UT (US)

(72) Inventor: Jair J. Gonzalez, Provo, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

(21) Appl. No.: 16/931,185

(22) Filed: Jul. 16, 2020

(65) Prior Publication Data

US 2020/0347877 A1 Nov. 5, 2020

Related U.S. Application Data

(63) Continuation of application No. 16/589,852, filed on Oct. 1, 2019, now Pat. No. 10,753,388, which is a
(Continued)

(51) Int. Cl.
*F16C 17/03* (2006.01)
*F16C 17/06* (2006.01)
(Continued)

(52) U.S. Cl.
CPC ............ *F16C 17/03* (2013.01); *F16C 17/028* (2013.01); *F16C 17/035* (2013.01); *F16C 17/047* (2013.01); *F16C 17/06* (2013.01); *F16C 17/065* (2013.01); *F16C 33/043* (2013.01); *F16C 37/00* (2013.01); *F16C 37/002* (2013.01); *F16C 2202/20* (2013.01); *F16C 2206/04* (2013.01); *F16C 2206/56* (2013.01); *F16C 2206/58* (2013.01); *F16C 2240/48* (2013.01);
(Continued)

(58) Field of Classification Search
CPC ...... F16C 17/028; F16C 17/03; F16C 17/035; F16C 17/06; F16C 17/065; F16C 33/043; F16C 37/00; F16C 37/002; F16C 2202/20; F16C 37/2206; F16C 37/04; F16C 37/56; F16C 37/58; F16C 2240/60; F16C 2240/90; F16C 2352/00; F16C 2360/00

See application file for complete search history.

(56) References Cited

U.S. PATENT DOCUMENTS 3,729,292 A 4/1973 Heck
4,227,752 A 10/1980 Wilcock
(Continued)

OTHER PUBLICATIONS

International Search Report and Written Opinion from International Application No. PCT/US2016/046053 dated Dec. 27, 2016.
(Continued)

*Primary Examiner* — Phillip A Johnson
(74) *Attorney, Agent, or Firm* — Dorsey & Whitney LLP

(57) ABSTRACT

Embodiments disclosed herein are directed to tilting pad bearing assemblies, bearing apparatuses including the tilting pad bearing assemblies, and methods of using the bearing apparatuses. The tilting pad bearing assemblies disclosed herein include a plurality of tilting pads. At least some of the superhard tables exhibit a thickness that is at least about 0.120 inch and/or at least two layers having different wear and/or thermal characteristics.

21 Claims, 9 Drawing Sheets

Related U.S. Application Data continuation of application No. 15/747,706, filed as application No. PCT/US2016/045053 on Aug. 8, 2016, now Pat. No. 10,473,154.

(60) Provisional application No. 62/210,301, filed on Aug. 26, 2015.

(51) Int. Cl.
  *F16C 17/02* (2006.01)
  *F16C 17/04* (2006.01)
  *F16C 37/00* (2006.01)
  *F16C 33/04* (2006.01)

(52) U.S. Cl.
  CPC ...... *F16C 2240/60* (2013.01); *F16C 2240/90* (2013.01); *F16C 2352/00* (2013.01); *F16C 2360/00* (2013.01)

(56) References Cited

U.S. PATENT DOCUMENTS

| | | | |
|---|---|---|---|
| 4,729,440 A | 3/1988 | Hall | |
| 5,092,687 A | 3/1992 | Hall | |
| 6,342,301 B1 | 1/2002 | Yoshida et al. | |
| 7,493,972 B1 | 2/2009 | Schmidt et al. | |
| 7,842,111 B1 | 11/2010 | Sani | |
| 7,896,551 B2 | 3/2011 | Cooley et al. | |
| 8,034,136 B2 * | 10/2011 | Sani | E21B 10/567 51/293 |
| 8,297,382 B2 | 10/2012 | Bertagnolli et al. | |
| 8,545,103 B1 * | 10/2013 | Cooley | F16C 17/03 384/306 |
| 8,646,981 B2 * | 2/2014 | Peterson | F16C 33/043 384/306 |
| 8,668,388 B1 | 3/2014 | Peterson | |
| 8,678,657 B1 | 3/2014 | Knuteson et al. | |
| 8,727,046 B2 | 5/2014 | Miess et al. | |
| 8,784,517 B1 | 7/2014 | Gerber et al. | |
| 8,967,871 B2 | 3/2015 | Sexton et al. | |
| 8,979,956 B2 | 3/2015 | Sani | |
| 9,080,385 B2 | 7/2015 | Sexton et al. | |
| 10,473,154 B2 | 11/2019 | Gonzalez | |
| 2007/0046120 A1 | 3/2007 | Cooley et al. | |
| 2009/0152018 A1 | 6/2009 | Sani | |
| 2009/0208301 A1 | 8/2009 | Kuroda et al. | |
| 2011/0042147 A1 | 2/2011 | Fang et al. | |
| 2011/0083908 A1 | 4/2011 | Shen et al. | |
| 2011/0259648 A1 | 10/2011 | Sani | |
| 2012/0281938 A1 | 11/2012 | Peterson et al. | |
| 2013/0098693 A1 | 4/2013 | Cooley et al. | |
| 2013/0182980 A1 | 7/2013 | Peterson et al. | |
| 2013/0192899 A1 | 8/2013 | Cooley et al. | |
| 2014/0318027 A1 | 10/2014 | Sani et al. | |

OTHER PUBLICATIONS

Issue Notification for U.S. Appl. No. 15/747,706 dated Oct. 23, 2019.
Non-Final Office Action for U.S. Appl. No. 15/747,706 dated Jan. 11, 2019.
Notice of Allowance for U.S. Appl. No. 15/747,706 dated Jul. 5, 2019.
Notice of Allowance for U.S. Appl. No. 16/589,852 dated Apr. 22, 2020.
Notice of Allowance for U.S. Appl. No. 16/589,852 dated Jan. 15, 2020.
U.S. Appl. No. 13/734,354, filed Jan. 4, 2013.
U.S. Appl. No. 15/747,706, filed Jan. 25, 2018.
U.S. Appl. No. 16/589,852, filed Oct. 1, 2019.
U.S. Appl. No. 61/948,970, filed Mar. 6, 2014.
U.S. Appl. No. 62/002,001, filed May 22, 2014.
U.S. Appl. No. 62/210,301, filed Aug. 26, 2015.

* cited by examiner

TILTING PAD BEARING ASSEMBLIES, AND BEARING APPARATUSES AND METHODS OF USING THE SAME

CROSS-REFERENCE TO RELATED APPLICATIONS

This application is a continuation of U.S. application Ser. No. 16/589,852 filed on Oct. 1, 2019, which is a continuation of U.S. application Ser. No. 15/747,706 filed on 25 Jan. 2018 (now issued as U.S. Pat. No. 10,473,154), which is a U.S. National Stage of PCT International Application No. PCT/US2016/045053 filed on 8 Aug. 2016, which claims priority to U.S. Provisional Application No. 62/210,301 filed on 26 Aug. 2015, the disclosure of each of which is incorporated herein, in its entirety, by this reference.

BACKGROUND

Wear-resistant, superhard compacts are utilized in a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical apparatuses.

PDCs and other superhard compacts have found particular utility as superhard bearing elements in thrust bearings within pumps, turbines, subterranean drilling systems, motors, compressors, generators, gearboxes, and other systems and apparatuses. For example, a PDC bearing element typically includes a superhard polycrystalline diamond layer that is commonly referred to as a polycrystalline diamond ("PCD") table. The PCD table can be formed and bonded to a substrate using a high-pressure/high-temperature ("HPHT") process. Typically, the thickness of the PCD table is less than about 0.080 inch to minimize the moment and/or shear forces applied to the PCD table and minimize manufacturing costs.

A bearing apparatus (e.g., a thrust-bearing apparatus) typically includes a number of superhard bearing elements affixed to a support ring. The superhard bearing elements (e.g., a PDC bearing element) bear against another superhard bearing element(s) of an opposing bearing assembly during use. Superhard bearing elements are typically brazed directly into corresponding preformed recesses formed in a support ring of a fixed-position thrust bearing.

Despite the availability of a number of different bearing apparatuses including such PDCs and/or other superhard materials, manufacturers and users of bearing apparatuses continue to seek bearing apparatuses that exhibit improved performance characteristics, lower cost, or both.

SUMMARY

Embodiments disclosed herein are directed to tilting pad bearing assemblies, bearing apparatuses including the tilting pad bearing assemblies, and methods of using the bearing apparatuses. As will be discussed in more detail herein, the tilting pad bearing assemblies include a plurality of tilting pads. A superhard table of at least some of the tilting pads include a superhard bearing surface and a lower surface that is generally opposite the superhard bearing surface, with the superhard table exhibiting a thickness (e.g., maximum thickness) that is at least about 0.120 inch and/or at least two layers having different wear and/or thermal characteristics. Such tilting pads may increase heat dissipation from the superhard table; increase a thickness of a fluid film between the superhard bearing surface and an opposing bearing surface; help maintain such fluid film; increase one or more of abrasion resistance, thermal resistance, impact resistance, or toughness of the superhard table; improve the bonding between the superhard table and another surface (e.g., a surface of a substrate), or combinations thereof.

In an embodiment, a tilting pad bearing assembly is disclosed. The tilting pad bearing assembly includes a support ring. The tilting pad bearing assembly further includes a plurality of tilting pads distributed circumferentially about an axis. The plurality of tilting pads are also tilted and/or tiltably secured relative to the support ring. Each of the plurality of tilting pads includes a superhard table including a superhard bearing surface, a lower surface, and at least one peripheral surface extending between the superhard bearing surface and the lower surface. The superhard table of at least some of the plurality of tilting pads includes at least one of a thickness that is at least about 0.120 inch or a lower layer extending from the lower surface towards the superhard bearing surface and an upper layer extending from at least a portion of the superhard bearing surface towards the lower surface. The upper layer exhibits a greater abrasion resistance than the lower layer.

In an embodiment, a bearing apparatus is disclosed. The bearing apparatus includes a first bearing assembly. The first bearing assembly including a first support ring. The first bearing assembly further includes one or more bearing elements distributed circumferentially about an axis. The one or more bearing elements include a bearing surface. The one or more bearing elements are secured to the first support ring. The bearing apparatus further includes a second bearing assembly. The second bearing assembly includes a second support ring. The second bearing assembly further includes a plurality of tilting pads distributed circumferentially about an axis. The plurality of tilting pads are also tilted and/or tiltably secured relative to the first support ring. Each of the plurality of tilting pads includes a superhard table including a superhard bearing surface, a lower surface, and at least one peripheral surface extending between the superhard bearing surface and the lower surface. The superhard table of at least some of the plurality of tilting pads includes at least one of a thickness that is at least about 0.120 inch or a lower layer extending from the lower surface towards the superhard bearing surface and an upper layer extending from at least a portion of the superhard bearing surface towards the lower surface. The upper layer exhibits a greater abrasion resistance than the lower layer.

In an embodiment, a method of operating a bearing apparatus is disclosed. The method includes rotating a rotor relative to a stator. At least one of the stator or the rotor includes a first support ring and one or more bearing elements distributed circumferentially about an axis. The one or more bearing elements include a bearing surface. The one or more bearing elements are secured to the first support ring. The other of the stator or the rotor includes a second support ring and a plurality of tilting pads distributed circumferentially about the axis. The plurality of tilting pads are also tilted and/or tiltably secured relative to the first support ring. Each of the plurality of tilting pads includes a superhard table including a superhard bearing surface, a lower surface, and at least one peripheral surface extending between the superhard bearing surface and the lower surface. The superhard table of at least some of the plurality of tilting pads includes at least one of a thickness that is at least about 0.120 inch or a lower layer extending from the lower surface towards the superhard bearing surface and an upper layer extending from at least a portion of the superhard bearing surface towards the lower surface. The upper layer exhibits a greater abrasion resistance than the lower layer.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Embodiments disclosed herein are directed to tilting pad bearing assemblies, bearing apparatuses including such tilting pad bearing assemblies, and methods of using such bearing apparatuses. As will be discussed in more detail herein, the tilting pad bearing assemblies include a plurality of tilting pads. A superhard table of at least some of the tilting pads include a superhard bearing surface and a lower surface that is generally opposite the superhard bearing surface, with the superhard table exhibiting a thickness (e.g., maximum thickness) that is at least about 0.120 inch and/or include at least two layers having different wear and/or thermal characteristics. Such tilting pads may increase heat dissipation from the superhard table; increase a thickness of a fluid film between the superhard bearing surface and an opposing bearing surface; help maintain such fluid film; increase one or more of abrasion resistance, thermal resistance, impact resistance, or toughness of the superhard table; improve the bonding between the superhard table and another surface (e.g., a surface of a substrate), or combinations thereof.

The embodiments of tilting pad bearing assemblies and bearing apparatuses disclosed herein may be employed in subterranean drilling assemblies, pumps, compressors, turbo expanders, or other mechanical systems. Motor assemblies including at least one such bearing assembly or bearing apparatus are also disclosed, as well as methods of fabricating and using such bearing assemblies and bearing apparatuses.

While the description herein provides examples relative to a subterranean drilling and motor assembly, the tilting pad bearing assembly and apparatus embodiments disclosed herein may be used in any number of applications. For example, the bearing assemblies and apparatuses may be used in a pump, turbine bearing apparatus, motor, compressor, generator, gearbox, and other systems and apparatuses, or in any combination of the foregoing. Furthermore, the bearing assemblies and apparatuses may also be operated in hydrodynamic, or mixed-mode or boundary (e.g., rubbing or sliding) lubrication regimes, if desired or needed.

Figure 1A:
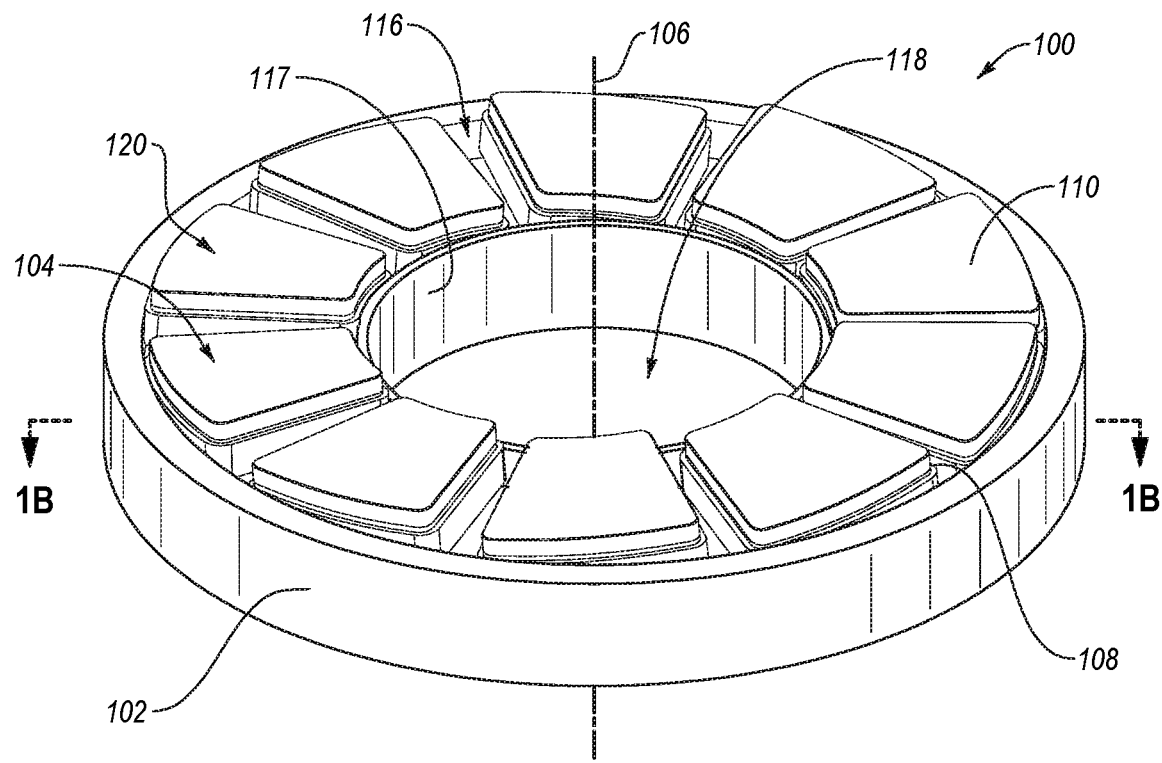
FIGS. 1A and 1B are isometric and isometric cutaway views, respectively, of a tilting pad thrust-bearing assembly, according to an embodiment.
Figure 1B:
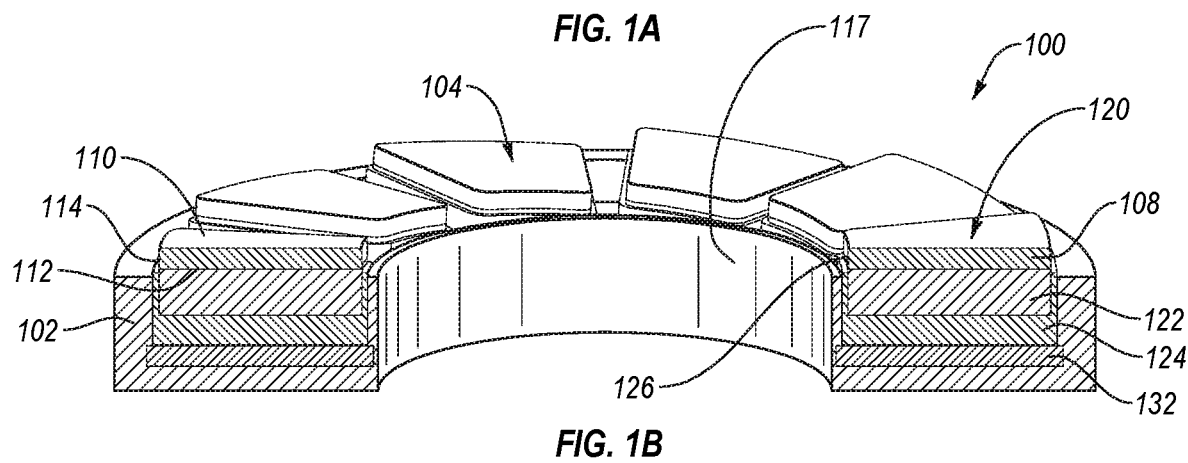

FIGS. 1A and 1B are isometric and isometric cutaway views, respectively, of a tilting pad thrust-bearing assembly 100, according to an embodiment. The thrust-bearing assembly 100 includes a support ring 102 and a plurality of tilting pads 104 tilted and/or tiltably secured to the support ring 102. The tilting pads 104 may be distributed circumferentially about a thrust axis 106. Each of the tilting pads 104 may include a superhard table 108. The superhard table 108 may include a superhard bearing surface 110, a lower surface 112 generally opposite the superhard bearing surface 110, and at least one peripheral surface 114 extending therebetween. At least some of (e.g., all of) the superhard tables 108 may include a thickness (e.g., maximum thickness) between the superhard bearing surface 110 and the lower surface 112 that is at least about 0.120 inch.

In an embodiment, the support ring 102 may include a channel 116 and the tilting pads 104 may be at least partially placed within the channel 116. The tilting pads 104 may be tilted and/or tiltably secured relative to the support ring 102 in any suitable manner. For example, as discussed hereafter, a pivotal connection may be used to secure the tilting pads 104 to the support ring 102, although any other suitable securement or attachment mechanism may also be utilized. The support ring 102 may include an inner, peripheral surface 117 defining a hole 118. The hole 118 may be generally centered about the thrust axis 106, and may be adapted to receive a shaft (e.g., a downhole drilling motor shaft, not shown).

The support ring 102 may be made from a variety of different materials. For example, the support ring 102 may be formed of steel, carbon steel, stainless steel, copper (e.g., brass or bronze alloys), tungsten carbide, another suitable material, or combinations thereof.

The tilting pads 104 may include at least one of fixed tilting pads, adjustable tilting pads, self-establishing tilting pads, other bearing pads or elements, or combinations thereof. In an embodiment, each of the tilting pads 104 may be located circumferentially adjacent to another tilting pad 104 with a circumferential space or other offset therebetween. For example, the circumferential space may be about 2.0 mm to about 20.0 mm. In an embodiment, the thrust-bearing assembly 100 may include 3 to 20 tilting pads, such as 5 to 12, or 10 to 18 tilting pads.

In an embodiment, each of the tilting pads 104 may include a superhard bearing element 120 defining the superhard table 108 including the superhard bearing surface 110. Collectively, the superhard bearing surfaces 110 of the tilting pads 104 may provide a substantially non-continuous superhard bearing surface of the thrust-bearing assembly 100. In an embodiment, each superhard bearing surface 110 may exhibit a generally truncated pie-shaped geometry, a generally circular geometry (e.g., generally cylindrical geometry), or a generally trapezoidal geometry. However, in other embodiments, each superhard bearing surface 110 may exhibit any suitable geometry.

As previously discussed, each of the plurality of tilting pads 104 includes the superhard table 108 that includes at least one superhard material. As used herein, the term "superhard" means a material having a hardness at least equal to the hardness of tungsten carbide. In an embodiment, the superhard material may include polycrystalline cubic boron nitride, polycrystalline diamond (e.g., formed by chemical vapor deposition or by HPHT sintering), diamond crystals, silicon carbide, silicon nitride, tantalum carbide, tungsten carbide (e.g., binderless tungsten carbide, cobalt-cemented tungsten carbide), boron carbide, other metal carbides, other superhard ceramic carbides, or combinations thereof. In another embodiment, the superhard material may include a reaction-bonded superhard ceramic, such as reaction-bonded silicon nitride, reaction-bonded silicon carbide, or another suitable reaction-bonded superhard ceramic. The reaction-bonded superhard ceramic may have additional materials at least partially embedded therein. For example, the additional materials may include diamond, polycrystalline diamond, cubic boron nitride, a material exhibiting a hardness greater than the reaction-bonded superhard ceramic, a material exhibiting a thermal conductivity greater than the reaction-bonded superhard ceramic, or combinations thereof. For example, diamond may be added to the reaction-bonded superhard ceramic in an amount less than about 80 weight % (e.g., about 80 weight % to about 50 weight %, about 50 weight % to about 25 weight %, less than about 25 weight %). The additional materials in the reaction-bonded superhard ceramic may improve a thermal conductivity and/or a wear resistance of the superhard bearing element 120. In an embodiment, the superhard bearing surface 110 may include a superhard coating applied to a superhard or non-superhard material.

In some instances, high loads on the superhard bearing elements 120 may cause the superhard tables 108 and, in particular, the superhard bearing surfaces 110 to exhibit relatively high temperatures during operation. In some embodiments, the relatively high temperatures may degrade and/or deteriorate the superhard table 108. Degrading and/or deteriorating the superhard table 108 may lead to failure of the corresponding superhard bearing element 120 and the thrust-bearing assembly 100. For example, the superhard table 108 may include a PCD table. The PCD table may degrade under certain operating conditions at temperatures greater than about 700° C. Additionally, the relatively high temperatures of the superhard table 108 may degrade or prevent formation of a fluid film between the superhard bearing surface 110 and an opposing bearing surface. Degrading or preventing the formation of the fluid film may increase contact between the superhard bearing surface 110 and the opposing bearing surface. Increased contact between the superhard bearing surface 110 and the opposing bearing surface may increase wear on the superhard bearing surface 110 and may further increase the temperature of the superhard bearing element 120. Therefore, the superhard bearing elements 120 may be configured to exhibit relatively low temperatures (e.g., less than 700° C.) during operation.

In some embodiments, the superhard bearing elements 120 may be configured to exhibit relatively low temperatures during operation by increasing heat dissipation from the superhard table 108 thereof. In an embodiment, increasing the thickness of the superhard table 108 may increase the heat dissipated from the superhard table 108 during use. For example, the increased thickness of the superhard table 108 may increase a surface area of the superhard table 108 exposed to a cooling medium (e.g., a lubricating fluid, drilling mud, etc.), thereby increasing the heat dissipated from the superhard bearing element 120 during operation. In some embodiments, the superhard table 108 may have a thickness (e.g., measured from the superhard bearing surface 110 to the lower surface 112) of about 0.120 inch to about 0.140 inch, about 0.120 inch to about 0.187 inch, about 0.120 inch to about 0.312 inch, about 0.156 inch to about 0.250 inch, or about 0.250 inch to about 0.312 inch. In some embodiments, the superhard table 108 may have a thickness that is at least about 0.120 inch, at least about 0.200 inch, at least about 0.3 inch, at least about 0.4 inch, at least about 0.5 inch, about 0.50 inch to about 0.75 inch, or at least about 0.75 inch.

Compared to a relatively thin superhard table (e.g., a superhard table having a thickness less than about 0.120 inch and, in particular, less than about 0.080 inch), the superhard table 108 exhibiting a thickness that is at least about 0.120 inch may exhibit increased heat dissipation therefrom. The increased heat dissipation of the superhard table 108 may lead to an increased load-bearing capacity of the thrust-bearing assembly 100, increased life expectancy of the superhard bearing elements 120 and the thrust-bearing assembly 100, and/or a thicker fluid film between the superhard bearing surface 110 and an opposing bearing surface. However, increasing the thickness of superhard table 108 may be costly and/or may increase moment and/or shear forces experienced by the superhard bearing elements 120. Accordingly, the thickness of the superhard table 108 may vary from one embodiment to the next. More specifically, among other things, the thickness of the superhard table 108 may depend on the overall size of the thrust-bearing assembly 100 and/or of the superhard bearing elements 120, the particle size of the polycrystalline diamond, the superhard material, amount that the bearing surface protrudes from the support ring 102, the bearing loads, the type of cooling medium, the number of start-ups and shut-downs of a system employing the thrust-bearing assembly 100, or combinations thereof.

In an embodiment, the superhard table 108 may be configured to have a maximum thickness at and/or near a peripheral surface 114 of the superhard table 108. Accordingly, increasing the maximum thickness of the superhard table 108 may increase the surface area of the peripheral surface 114, which may increase the overall exposure of the superhard table 108 to the cooling medium.

The superhard table 108 may include at least one superhard material exhibiting a relatively high thermal conductivity. The relatively high thermal conductivity may enable the superhard table 108 to dissipate heat from the superhard bearing surface 110 and the peripheral surface 114. In an embodiment, a superhard material exhibiting a relatively high thermal conductivity may include a superhard material exhibiting a thermal conductivity of about 100 W/m·K or greater. In another embodiment, the superhard table 108 may include a superhard material exhibiting an ultra-high thermal conductivity. A superhard material exhibiting an ultra-high thermal conductivity may include any superhard material exhibiting a thermal conductivity of about 500 W/m·K or greater, such as about 700 W/m·K or greater, or about 1000 W/m·K or greater. For example, PCD may exhibit an ultra-high thermal conductivity. In an embodiment, the superhard table 108 may include a superhard material exhibiting a thermal conductivity greater than at least one of the thermal conductivity of the support ring 102, another part of the superhard bearing element 120 (e.g., substrate 122), or another part of the tilting pad 104 (e.g., support plate 124).

In an embodiment, the superhard table 108 may be configured such that the superhard bearing surface 110 is substantially planar and substantially parallel to the lower surface 112. In such an embodiment, the thickness of the superhard table 108 may be substantially uniform therethrough and approximately equal to the maximum thickness of the superhard table 108. For example, the maximum thickness of the superhard table 108 may be at or near the peripheral surface 114 to thereby increase a surface area of the superhard table 108 that is exposed to the lubricating fluid during use.

In an embodiment, the superhard table 108 may be configured such that the superhard bearing surface 110 is not substantially parallel with the lower surface 112 of the superhard table 108. In particular, the superhard table 108 may be configured such that the thickness of the superhard table 108 varies (e.g., the superhard bearing surface 110 is substantially planar and the lower surface 112 is non-planar). For example, the relatively thick superhard table 108 may include a portion exhibiting a thickness that is at least about 0.120 inch and another portion exhibiting a thickness less than about 0.120 inch. In an embodiment, the maximum thickness of the superhard table 108 may be at or near at least a portion of the peripheral surface 114 of the superhard table 108. In an embodiment, the maximum thickness of the superhard table 108 may be spaced from the at least one peripheral surface 114 of the superhard table 108. For example, in some embodiments, the lower surface 112 may extend between the at least one peripheral surface 114 of the superhard table such that the lower surface 112 forms a portion of a generally concave or convex cylindrical surface, a portion of a generally concave or convex spherical surface, a generally concave or convex conical surface, a stepped geometry, or other suitable geometry. Maximizing the surface area of the lower surface 112 may enable the superhard table 108 to strengthen the bond with the substrate 122 and increase the amount of heat dissipated from the superhard table 108 to an object contacting the lower surface 112 of the superhard table 108 (e.g., the substrate 122, the support plate 124, or the support ring 102). Further details and examples describing how the lower surface 112 may extend between the at least one peripheral surface 114 of the superhard table 108 are disclosed in U.S. Pat. No. 9,080,385, the disclosure of which is incorporated herein, in its entirety, by this reference. Any of the embodiments disclosed in U.S. Pat. No. 9,080,385 may be used in combination with the features and/or embodiments disclosed herein.

In an embodiment, the superhard bearing elements 120 may exhibit a shape that is configured to increase its surface area to volume ratio. The relatively increased surface area to volume ratio may increase the heat dissipated from the superhard table 108. For example, the superhard table 108 may exhibit a single peripheral surface 114 (e.g., following or forming a generally cylindrical surface). Increasing the thickness of the superhard table 108 and the single peripheral surface 114 may increase the exposed surface area of the superhard table 108. In an embodiment, the superhard table 108 may include two or more peripheral surfaces 114, (e.g., following or forming a generally triangular shape, a generally rectangular shape, a generally trapezoidal shape, or any other suitable peripheral shape). The two or more peripheral surfaces 114 may further increase the exposed surface area of the superhard table 108. Additionally, the superhard table 108 may include sharp, chamfered, or curved edges between the two peripheral surfaces 114 to further increase the exposed surface area of the superhard table 108. In an embodiment, the at least one peripheral surface 114 may include one or more features formed therein configured to increase the exposed surface area of the superhard table 108. In particular, at least a portion of the at least one peripheral surface 114 may include one or more features (e.g., ridges, notches, slots, dimples, recesses, etc.) configured to increase the exposed surface area of the superhard table 108.

In some embodiments, the relatively thick superhard tables 108 may increase the expected life of the thrust-bearing assembly 100 and thrust-bearing apparatuses using the same. For example, the increased heat dissipation of the relatively thick superhard tables 108 may improve the quality of the fluid film between the superhard bearing surfaces 110 and an opposing bearing surface. In particular, the increased heat dissipation may enable a thicker, more uniform, and/or more consistent fluid film to form between the superhard bearing surfaces 110 and the opposing bearing surface. As such, the improved fluid film may decrease the amount of contact between the superhard bearing surfaces 110 and the opposing bearing surface. The decreased contact between the bearing surfaces may decrease wear on the superhard bearing surfaces 110 and may decrease heat generated by the superhard bearing elements 120.

In some embodiments, the relatively thick superhard tables 108 may increase the performance of the thrust-bearing assembly 100. For example, the relatively thick superhard tables 108 may enable the thrust-bearing assembly to increase the load bearing capacity thereof. In particular, the higher bearing capacities may cause the superhard bearing surfaces 110 of each of the superhard bearing elements 120 to contact an opposing bearing surface. Contacting the superhard bearing surfaces 110 against the opposing bearing surface may generate additional heat. The relatively thick superhard tables 108 may increase the heat dissipated therefrom compared to relatively less thick superhard tables. In an embodiment, as discussed above, the increased heat dissipation may improve the quality of a fluid film between the superhard bearing surfaces 110 and the opposing bearing surface. As such, the thick superhard tables 108 may improve the performance (e.g., increase load bearing capacity) and/or the life (e.g., prevents or inhibits overheating, uneven heating, or wear) of the thrust-bearing assembly 100 and thrust-bearing apparatuses using the same.

Referring to FIG. 1B, the superhard table 108 of the superhard bearing element 120 may be bonded to the substrate 122. In an embodiment, the superhard bearing element 120 may be a PDC. The PDC may include a PCD table bonded to the substrate 122. The PCD table includes a plurality of directly bonded-together diamond grains exhibiting diamond-to-diamond bonding therebetween (e.g., $sp^3$ bonding), which define a plurality of interstitial regions. A portion of, or substantially all of, the interstitial regions of the PCD table may include a metal-solvent catalyst (e.g., iron, nickel, cobalt, or alloys thereof) and/or a metallic infiltrant disposed therein that is infiltrated from the substrate 122 or from another source during fabrication. The PCD table may further include thermally-stable diamond in which the metal-solvent catalyst and/or another infiltrant has been at least partially removed from a volume of the PCD table.

In an embodiment, the PDC may be formed, for example, by placing diamond particles adjacent to the substrate 122 to form an assembly. The amount of diamond particles may be sufficient to form a relatively thick PCD table. The assembly may be subject to HPHT process to form the PCD table and bond the PCD table to the substrate 122, thereby forming the PDC. The temperature of the HPHT process may be at least about 1000° C. (e.g., about 1200° C. to about 1600° C.) and the cell pressure of the HPHT process may be at least about 4.0 GPa (e.g., at least about 7.5 GPa, about 5.0 GPa to about 12 GPA, or about 7.5 GPa to about 11 GPa) for a time sufficient to sinter the diamond particles. During the HPHT process, a metal-solvent catalyst (e.g., cobalt, iron, nickel, or alloys thereof) may infiltrant the diamond grains from the substrate 122 to catalyze formation of diamond-to-diamond bonding (e.g., $sp^3$) between the diamond grains and bond the PCD table to the substrate 122. The bonded together diamond grains may define a plurality of interstitial regions therebetween that may be at least partially occupied by the metal-solvent catalyst. In some embodiments, the PDC may be further processed to include a thermally-stable PCD table.

The diamond particles used to form the PCD table may exhibit an average particle size of about 50 μm or less, such as about 40 μm or less, about 30 μm or less, about 20 μm or less, about 10 μm to about 18 μm, or about 15 μm to about 18 μm. In some embodiments, the average particle size of the diamond particles may be about 10 μm or less, such as about 2 μm to about 5 μm or submicron. In some embodiments, the diamond particles may comprise a relatively larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the mass of diamond particles may include a portion exhibiting a relatively larger size (e.g., 40 μm, 30 μm, 25 μm, 20 μm, 15 μm, 12 μm, 10 μm, 8 μm) and another portion exhibiting at least one relatively smaller size (e.g., 6 μm, 5 μm, 4 μm, 3 μm, 2 μm, 1 μm, 0.5 μm, less than 0.5 μm, 0.1 μm, less than 0.1 μm). In one embodiment, the diamond particles may include a portion exhibiting a relatively larger size between about 10 μm and about 40 μm and another portion exhibiting a relatively smaller size between about 1 μm and 4 μm. In some embodiments, the diamond particles may comprise three or more different sizes (e.g., one relatively larger size and two or more relatively smaller sizes), without limitation. In other embodiments, the diamond particles may exhibit a single mode or bimodal size distribution (e.g., a single mode or any of the foregoing sizes). The PCD table so-formed after sintering may exhibit an average diamond grain size that is the same or similar to any of the foregoing diamond particle sizes and distributions.

More details about diamond particle sizes and diamond particle size distributions that may be employed are disclosed in U.S. patent application Ser. No. 13/734,354; U.S. Provisional Patent Application No. 61/948,970; and U.S. Provisional Patent Application No. 62/002,001. The disclosures of each of U.S. patent application Ser. No. 13/734,354; U.S. Provisional Patent Application No. 61/948,970; and U.S. Provisional Patent Application No. 62/002,001 are incorporated herein, in their entirety, by this reference.

In an embodiment, the superhard table 108 may be integrally formed with the substrate 122. For example, the superhard table 108 may be a sintered PCD table that is integrally formed with the substrate 122. In an embodiment, the superhard table 108 may be a pre-formed superhard table that has been HPHT bonded to the substrate 122 or otherwise bonded to the substrate 122 in a non-HPHT process such as brazing. For example, the superhard table 108 may be a pre-formed PCD table that has been leached to substantially completely remove the metal-solvent catalyst used in the HPHT sintering thereof and subsequently HPHT bonded or brazed to the substrate 122 in a separate process.

In some embodiments, the superhard table 108 may be leached to deplete at least a portion of a catalyst or a metallic infiltrant therefrom in order to enhance the thermal stability of the superhard table 108. For example, when the superhard table 108 is a PCD table, the superhard table 108 may be leached to remove at least a portion of a metal-solvent catalyst from a region thereof to a selected depth to form a leached thermally-stable region. The leached thermally-stable region may extend inwardly from the superhard bearing surface 110 to a selected depth. In an embodiment, the depth of the thermally-stable region may be about 10 μm to about 600 μm. More specifically, in some embodiments, the selected depth is about 50 μm to about 100 μm, about 100 μm to about 350 μm, or about 350 μm to about 600 μm. The leaching may be performed in a suitable acid, such as aqua regia, nitric acid, hydrofluoric acid, or mixtures of the foregoing.

In an embodiment, the PDC formed in the HPHT process may be machined such that the superhard bearing surface 110 exhibits a selected geometry (e.g., generally truncated pie-shaped geometry). For example, the PDC may be machined using electrical discharge machining (e.g., wire electrical discharge machining), a laser, or any other suitable machining process. The PDC may be machined before or after the superhard table 108 is at least partially leached.

The substrate 122 may be formed from any number of materials, and may be integrally formed with, or otherwise bonded or connected to, the superhard table 108. Materials suitable for the substrate 122 may include, without limitation, cemented carbides, such as tungsten carbide, titanium carbide, chromium carbide, niobium carbide, tantalum carbide, vanadium carbide, or combinations thereof cemented with iron, nickel, cobalt, or alloys thereof. For example, in an embodiment, the substrate 122 comprises cobalt-cemented tungsten carbide. However, in certain embodiments, the substrate 122 may be omitted.

In the illustrated embodiment, each of the superhard bearing elements 120 may be secured to a support plate 124 (FIG. 1B). The support plate 124 may, for example, be formed of a metal, an alloy, a cemented carbide material, other material, or combinations thereof. In an embodiment, the superhard bearing elements 120 may be secured to the support plate 124 by brazing, welding, mechanical fastening, press-fitting, another suitable method, or combinations thereof. In some embodiments, the support plate 124 may define a pocket into which the superhard bearing elements 120 may be tiltably or fixedly assembled and/or positioned. In an embodiment, the support plate 124 has an integral construction such that a single body may form substantially the entire support plate 124.

Figure 1C:
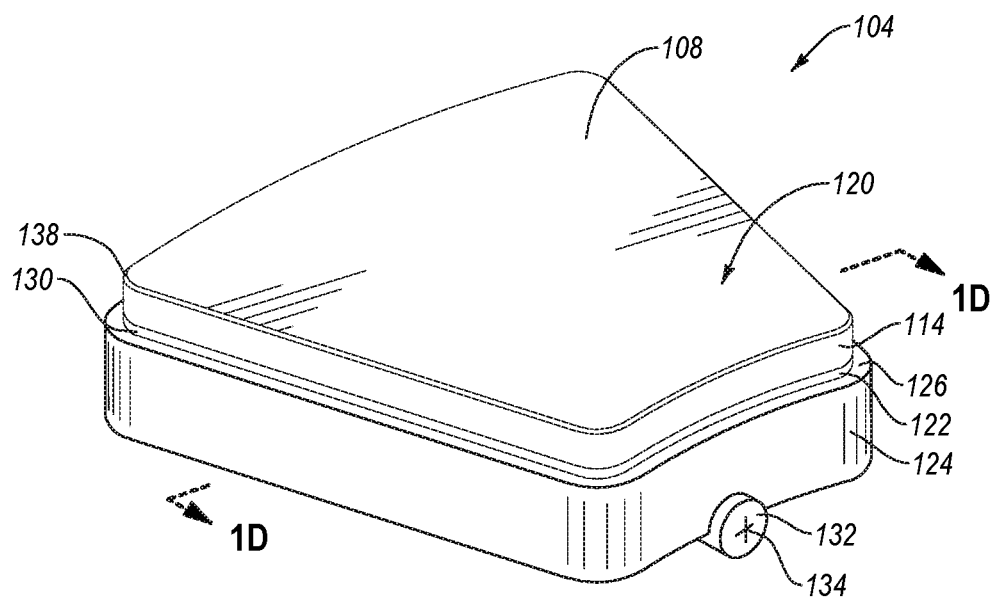
FIGS. 1C and 1D are isometric and cross-sectional views, respectively, of one of the plurality of tilting pads shown in FIGS. 1A and 1B, according to an embodiment.
Figure 1D:
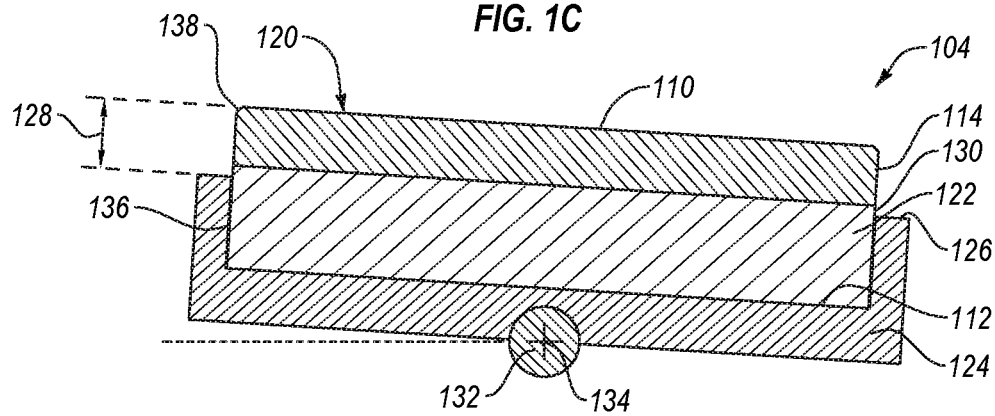

Referring to FIG. 1D, in an embodiment, the superhard bearing elements 120 may protrude from the support plate 124 in a manner that increases exposure of at least a portion of the peripheral surface 114 of the superhard table 108 to a cooling medium. In other words, the superhard bearing elements 120 may have an exposed protruding portion that extends above a top surface 126 of the support plate 124 a distance 128 (measured from the superhard bearing surface 110 to the top surface 126), which is equal to, less than, or greater than the thickness of at least a portion of the peripheral surface 114 of the superhard table (e.g., the entire thickness of the peripheral surface 114). Hence, in some embodiments, the distance 128 may be about 0.150 inch or more, about 0.120 inch or more, about 0.090 inch or more, such as about 0.090 inch to about 0.20 inch, about 0.18 inch to about 0.030 inch, about 0.025 inch to about 0.40 inch, about 0.30 inch to about 0.50 inch, or about 0.50 inch or more. In other embodiments, the superhard bearing elements 120 may extend beyond the top surface 126 of the support plate 124 to a distance 128 of about 0.90 or more multiplied by the maximum thickness of the superhard table 108 (e.g., a superhard table 108 exhibiting a maximum thickness of about 0.20 inch may extend beyond the top surface 126 by 0.18 inch or more). The distance 128 that the superhard bearing elements 120 extends beyond the top surface 126 of the support plate 124 may be selected to increase or maximize the surface area of the superhard table 108 exposed to the lubricating fluid. For example, the distance 128 that the superhard bearing elements 120 extend beyond the top surface 126 may be selected based on the composition of the superhard table 108 (e.g., a stronger and/or tougher material may extend a greater distance from the top surface 126 than a weaker and/or less tough material), the expected bearing capacity of the thrust-bearing assembly, the composition of the substrate 122, the strength of the bond between the superhard table 108 and the substrate 122, the maximum expected operating temperature of the superhard table 108, the thermal conductivity of one or more components of the thrust-bearing assembly 100 (e.g., the substrate 122), or combinations thereof.

In some embodiments, a portion of the peripheral surface 114 of the superhard table 108 may not protrude above the top surface 126 of the support plate 124 or only a relatively small portion of the peripheral surface 114 may protrude about the top surface 126. In other words, a portion of the peripheral surface 114 may be in direct contact with or adjacent to the support plate 124. However, the portion of the support plate 124 that is in direct contact with or adjacent to the support plate 124 may still enhance heat dissipation from the superhard bearing element 120. For example, heat can be dissipated from the peripheral surface 114 of the superhard table 108 through the support plate 124.

In some embodiments, the tilting pad 104 may be configured such that the substrate 122 may also protrude above the top surface 126 of the support plate 124. Exposing a peripheral surface 130 (FIG. 1C) of the substrate 122 may increase the heat dissipated from the superhard table 108. In particular, the peripheral surface 130 of the substrate 122 may contact the cooling medium that removes heat from the peripheral surface 130 of the substrate 122. For example, dissipating heat from the substrate 122 may increase a temperature gradient between the superhard bearing surface 110 and the substrate 122, thereby increasing the amount of heat dissipated from the superhard table 108 to the substrate 122. As such, the substrate 122 may protrude a distance (measured from the interface between the superhard table 108 and the substrate 122 to the top surface 126) that is greater than 0 inch, such as greater than about 0 inch to about 0.10 inch, about 0.05 inch to about 0.20 inch, or about 0.20 inch or greater. As such, the substrate 122 may include a material configured to dissipate heat from the superhard table 108, such as a material exhibiting a thermal conductivity of about 100 W/m·K or greater. The distance the substrate 122 protrudes above the top surface 126 may be selected to increase or maximize the surface area of the substrate 122 exposed to the cooling medium while accommodating the forces exerted on the superhard bearing element 120.

In some embodiments, the thrust-bearing assembly 100 may be configured to dissipate heat from the superhard bearing elements 120 via the support plate 124. For example, the support plate 124 may be thermally coupled to the superhard table 108 either directly (e.g., a portion of the superhard table 108 directly contacts the support plate 124) or indirectly (e.g., through the substrate 122 and/or braze material between support plate 124 and substrate 122). The support plate 124 may also include or be formed from a thermally conductive material, such as copper or a copper alloy, to further help dissipate heat from the superhard table 108. At least a portion of the support plate 124 may be exposed to a cooling medium during operation of the thrust-bearing assembly 100. For example, the support plate 124 may be positioned in the channel 116 to expose at least a portion of the support plate 124 to the cooling medium. In an embodiment, the top surface 126 of the support plate 124 may be exposed to the cooling medium.

The degree to which the tilting pads 104 rotate or tilt may be varied in any suitable manner. In an embodiment, the tilting pads 104 may be tilted about respective radial axes that extend generally radially outward from the thrust axis 106. In an embodiment, the support plate 124 may be attached to a pin 132. The pin 132 may, for example, be formed of a metal, an alloy, a cemented carbide material, other material, or any combinations thereof. The pin 132 may at least partially rotate, or may otherwise define or correspond to a tilt axis 134. For example, the pin 132 may be journaled or otherwise secured within the support ring 102 in a manner that allows the support plate 124 to rotate relative to the support ring 102. In some embodiments, the support plate 124 and/or the pin 132 may rotate or tilt from about zero to about twenty degrees about the tilt axis 134. In some embodiments, the support ring 102 may be configured for bidirectional rotation. In such an embodiment, the pin 132 may be allowed to rotate in clockwise and/or counterclockwise directions. For example, the support plate 124 and/or the pin 132 may rotate or tilt between a positive angle or negative angle of about twenty degrees relative to the tilt axis 134. The one or more of the tilting pads 104 may be self-establishing or limiting such that the tilting pads 104 may adjust or limit to a desired tilt or other orientation based on the lubricant used, the axial forces applied along the thrust axis 106, the rotation speed of the runner and/or the thrust-bearing assembly 100, other factors, or combinations of the foregoing. In other embodiments, at least some of the tilting pads 104 may be fixed at a particular tilt, or may be manually set to a particular tilt with or without being self-establishing.

Further, the pin 132 represents one embodiment of a mechanism for facilitating rotation, translation, or positioning of the tilting pads 104. In other embodiments, leveling links, pivotal rockers, spherical pivots, biasing elements, other elements, or any combination of the foregoing may also be used to tilt at least some of the tilting pads 104. In an embodiment, the support plate 124 may be used to facilitate rotation or tilt of a respective tilting pad 104. For example, the support plate 124 may include a spherical pivot, pivotal rocker, or leveling link interface. In other embodiments, the support plate 124 may be eliminated and the substrate 122 may be directly machined or otherwise formed to tilt at least some of the tilting pads 104. Examples of tilting mechanisms that may be employed are disclosed in U.S. Pat. No. 8,967,871, the disclosure of which is incorporated herein, in its entirety, by this reference.

FIGS. 1C and 1D are isometric and cross-sectional views, respectively, of one of the plurality of tilting pads 104 shown in FIGS. 1A and 1B, according to an embodiment. The tilting pad 104 may include a superhard bearing element 120. The superhard bearing element 120 may be secured to a support plate 124 by brazing, adhesives (e.g., high-temperature adhesives), press-fitting, fastening with fasteners, or other suitable attachment mechanisms. In the illustrated embodiment, the support plate 124 may facilitate attachment of the superhard bearing element 120 to the support plate 124 by including an interior pocket 136. The interior pocket 136 may be sized to generally correspond to a size of the substrate 122. It is noted that the support plate 124 merely represents one embodiment for a support plate and other configurations may be used. For example, the support plate 124 may lack a pocket or other receptacle.

In the illustrated embodiment, the superhard bearing surface 110 is substantially planar, although such an embodiment is merely illustrative. In other embodiments, the first superhard bearing surface 110 may be curved, or have another contour or topography. Moreover, outer edges of the superhard bearing element 120 may optionally include a chamfer 138. The chamfer 138 may be formed by placing a chamfer that extends between the superhard bearing surface 110 and the peripheral surface 114.

Figure 1E:
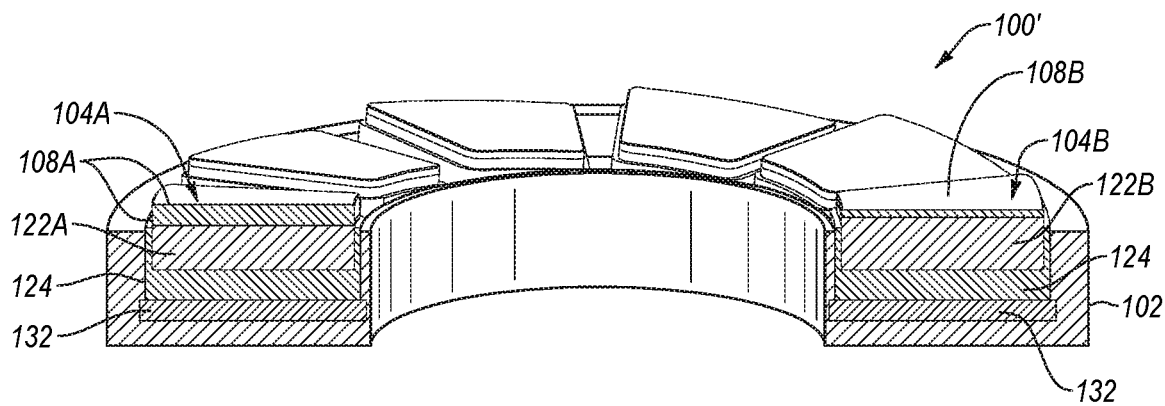
FIG. 1E is an isometric cutaway view of a tilting pad thrust-bearing assembly, according to an embodiment.

FIG. 1E is an isometric partial cross-sectional view of a tilting pad thrust-bearing assembly 100', according to an embodiment. The thrust-bearing assembly 100' may be substantially similar to the thrust-bearing assembly 100 shown in FIGS. 1A and 1B. The support ring 102 carries a plurality of first tilting pads 104A. The plurality of first tilting pads 104A may be substantially similar to the tilting pads 104 shown in FIGS. 1A-1D. For example, the plurality of first tilting pads 104A may include a first superhard table 108A exhibiting a first thickness (e.g., first maximum thickness). The first thickness may be relatively thick (e.g., at least about 0.120 inch). The first superhard table 108A may be bonded to a substrate 122A. The first tilting pads 104A may also include a support plate 124 secured to the substrate 122A and a pin 132, though the support plate 124 and/or the pin 132 may be omitted.

The thrust-bearing assembly 100' may also include a plurality of second tilting pads 104B. The second tilting pads 104B include a second superhard table 108B exhibiting a second thickness (e.g., second maximum thickness), the second thickness being different than the first maximum thickness. In an embodiment, the second thickness may be less than the first maximum thickness. For example, the second thickness may be less than about 0.120 inch, such as less than about 0.800 inch. The superhard table 108B may be bonded to a substrate 122B. The second tilting pads 104B may further include a support plate 124 having the substrate 122B secured thereto and a pin 132, though the support plate 124 and/or the pin 132 may be omitted.

The second tilting pads 104B may decrease the overall cost of the thrust-bearing assembly 100' compared to a thrust-bearing assembly consisting entirely of the first tilting pads 104A. As such, the thrust-bearing assembly 100' may include the benefits of the first tilting pads 104A (e.g., increased performance and/or increased life expectancy) while reducing costs.

Additionally, in some embodiments, certain portions of the thrust-bearing assembly 100' may be more prominent (e.g., exposed to a greater load and/or wear) than other portions of the thrust-bearing assembly 100'. As such, the tilting pads at or near the more prominent portions of the thrust-bearing assembly 100' may include the first tilting pads 104A, while the remaining portions of the thrust-bearing assembly 100' may include the second tilting pads 104B. In an embodiment, the second tilting pads 104B may include a material that exhibits a higher operating temperature than the first tilting pads 104A and, therefore, the second tilting pads 104B do not need to dissipate heat as efficiently as the first tilting pads 104A.

In an embodiment, the thrust-bearing assembly 100' may include a plurality of third tilting pads (not shown). Each of the third tilting pads may include a superhard table (not shown) exhibiting a third thickness (e.g., third maximum thickness) that is between the first thickness and the second thickness. Similarly, the thrust-bearing assembly 100' may include additional tilting pads (e.g., a plurality of fourth tilting pads, a plurality of fifth tilting pads, etc.), where each of the additional tilting pads exhibit a thickness (e.g., maximum thickness) that is different than the first, second, and third thicknesses.

Figure 2:
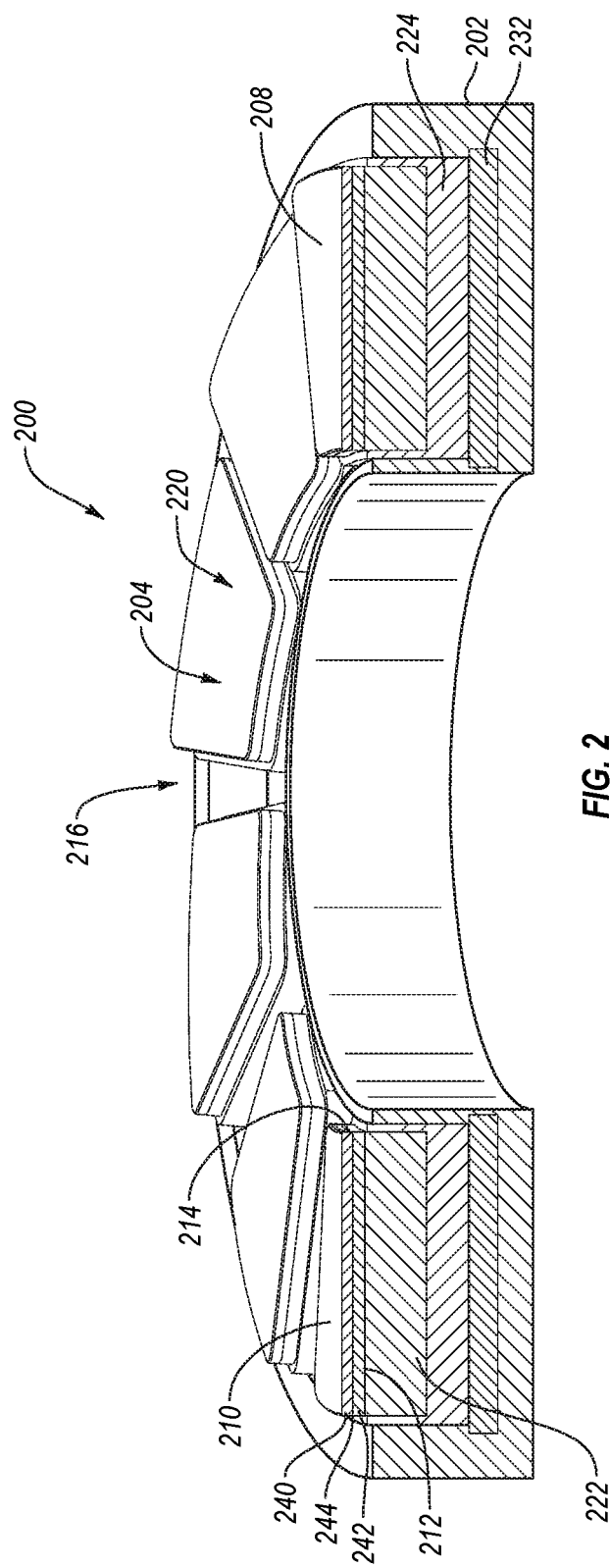
FIG. 2 is an isometric cutaway view of a tilting pad thrust-bearing assembly, according to an embodiment.

FIG. 2 is an isometric cutaway view of a tilting pad thrust-bearing assembly 200, according to an embodiment. Except as otherwise disclosed herein, the thrust-bearing assembly 200 may be substantially similar to the thrust-bearing assembly 100 shown in FIGS. 1A and 1B. For example, the thrust-bearing assembly 200 includes a support ring 202 configured to carry a plurality of tilting pads 204. The support ring 202 may also include a channel 216 having the tilting pads 204 at least partially positioned therein. Each of the tilting pads 204 may include a superhard bearing element 220. Each tilting pad 204 may also include a support plate 224 secured to a superhard bearing element 220 and a pin 232. However, in some embodiments, the support plate 224 and/or the pin 232 may be omitted.

Each of superhard bearing elements 220 includes a superhard table 208. Each superhard table 208 may include any of the superhard materials disclosed herein. Each superhard table 208 also includes a superhard bearing surface 210, a generally opposing lower surface 212, and a peripheral surface 214 extending between the superhard bearing surface 210 and the lower surface 212 In some embodiments, the superhard bearing elements 220 may include a substrate 222 bonded to the lower surface 212 of the superhard table 208. The substrate 222 may include any of the substrate materials disclosed herein. For example, the superhard bearing element 220 may include a PCD table bonded to a cobalt-cemented tungsten carbide substrate. Alternatively, the substrate 222 may be omitted.

Each superhard table 208 may include at least two layers, such as two layers, three layers, or four or more layers. The at least two layers include at least an upper layer 240 and a lower layer 242. The upper layer 240 extends from at least a portion of the superhard bearing surface 210 (e.g., adjacent to the entire superhard bearing surface 210) for a selected distance (e.g., greater than about 250 μm, greater than about 500 μm) towards the lower surface 212. Similarly, the lower layer 242 extends from the lower surface 212 for a selected distance towards the superhard bearing surface 210. In some embodiments, the lower layer 242 may extend from the lower surface 212 to the upper layer 240, thereby forming an interface 244 between the upper layer and the lower layer 242. In other embodiments, the superhard table 208 may include at least one intermediate layer (not shown) positioned between at least a portion of the upper layer 240 and at least a portion of the lower layer 242. In such an embodiment, an interface may exist between the between the intermediate layer and the upper layer 240 or the lower layer 242. In an embodiment, the intermediate layer may be formed by the mixing of the upper layer 240 and the lower layer 242 during formation of the superhard table 208 (e.g., during sintering). In one embodiment, the upper layer 240 and the lower layer 242 may include substantially the same superhard material (e.g., PCD).

In some embodiments, the lower layer 242 is configured to act as a transition layer between the upper layer 240 and the substrate 222. For example, the lower layer 242 may be configured to be tougher than the upper layer 240 and/or configured to help moderate coefficient of thermal expansion mismatch between the superhard table 208 and the substrate 222, which may enable the superhard table 208 to better withstand thermal strain (e.g., caused by heating and cooling the superhard bearing element 220). For example, the lower layer 242 may be formulated to exhibit a coefficient of thermal expansion that is less than the upper layer 240 and greater than the substrate 222. The at least one intermediate layer may also be configured to act as a transition layer between the lower layer 242 and the upper layer 240.

In some embodiments, the upper layer 240 is configured to exhibit an abrasion resistance that is greater than the lower layer 242. For example, the upper layer 240 may include an upper average grain size and the lower layer 242 may include a lower average grain size that is different than the upper average grain size. The upper average grain size may be selected such that the upper layer 240 exhibits an abrasion resistance that is greater than the lower layer 242. For example, the upper layer 240 may exhibit an abrasion resistance greater than the lower layer 242 by having the upper average grain size be greater than the lower average grain size. In another embodiment, the upper layer 240 may exhibit an abrasion resistance greater than the lower layer 242 by having the upper average grain size be less than the lower average grain size. Whether the upper layer 240 exhibits an upper average grain size that is greater than or less than the lower average grain size may depend on the cooling medium, the superhard material of the upper layer 240 and the lower layer 242, the configuration of the bearing surface of the opposing bearing assembly (e.g., the composition of the bearing surface, a substantially continuous bearing surface or a substantially non-continuous bearing surface, etc.), the load on the tilting pads 204, etc.

The relative abrasion resistance between the upper layer 240 and the lower layer 242 may be evaluated using a vertical lathe test (e.g., vertical turret lathe). For example, the relative abrasion resistance between the upper layer 240 and the lower layer 242 may be determined using a first cutting element including a first superhard table having only the upper layer 240 and a second cutting element including a second superhard table having only the lower layer 242. The abrasion resistance is determined by comparing a volume of workpiece cut and a volume of the cutting element worn away, using water as a coolant to cool the workpiece, during the vertical lathe test. The relative abrasion resistance between the upper layer 240 and the lower layer 242 may be determined by evaluating the difference in the volume worn away between the first superhard table of the first cutting element and the second superhard table of the second cutting element. The more volume removed from one of the first or second superhard tables during the cutting test is an indication that it is relatively less abrasion resistant than the other one of the first or second superhard tables. An example of suitable parameters that may be used to determine the abrasion resistance of the upper layer 240 and the lower layer 242 are a depth cut for the cutting element of about 0.254 mm, a back rake angle for the cutting element of about 20 degrees, an in-feed for the cutting element of about 6.35 mm/rev, a rotary speed of the workpiece to be cut of about 101 rpm, and the workpiece may be made from Bane granite having a 914 mm outer diameter and a 254 mm inner diameter. In other embodiments, any suitable test method for conducting abrasion resistance tests for superhard materials may be used. For example, the American Society for Testing and Materials ("ASTM") has numerous standards that may be suitable for abrasion resistance testing of the upper layer 240 and the lower layer 242.

In an embodiment, the lower average grain size may be at least about 2 times the size of the upper average grain size. In such an embodiment, the relatively coarse lower average grain size may increase the toughness of the superhard table 208, while the relatively fine upper average grain size may increase an abrasion resistance of the superhard table 208 and/or an impact resistance of the superhard table 208. Additionally, in some embodiments, the relatively coarse lower average grain size may improve the bond between the superhard table 208 and the substrate 222.

In an embodiment, the lower average grain size may be at least about 2.0 times (e.g., about 2 times to about 3.5 times, 3.5 times to about 5 times, or at least about 5 times) the size the upper average grain size. In particular, the lower average grain size may be at least about 20 µm, at least about 40 µm, at least about 50 µm, at least about 60 µm, about 50 µm to about 75 µm, about 60 µm to about 80 µm, or greater than about 80 µm; and the upper average grain size may be less than about 40 µm, such as about 10 µm to about 40 µm, 15 µm to about 35 µm, 20 µm to about 35 µm, about 20 µm, about 30 µm, or less than about 10 µm. In other embodiments, the lower average grain size may be less than about 20 µm. In other embodiments, the upper average grain size may be greater than about 40 µm so long as the lower average grain size is at least 2 times the size of the fine upper average grain size. It should be noted that the upper layer 240 and/or the lower layer 242 may exhibit bimodal or greater particle size distributions. For example, the upper layer 240 may exhibit a first average grain size of about 20 µm and the lower layer 242 may exhibit a second average grain size of about 2 µm. Examples of PDCs having more than one layer that may be used for the PDCs of the tilting pads disclosed herein are disclosed in U.S. Pat. No. 8,297,382, the disclosure of which is incorporated herein, in its entirety, by this reference.

In an embodiment, the upper layer 240 may exhibit a larger average grain size than the average grain size of the lower layer 242. For example, the upper average grain size may be at least about 2 times the size of the lower average grain size. The relatively coarser upper average grain size may increase the abrasion resistance and/or toughness of the superhard table 208, depending on the application of the thrust-bearing assembly 200. Additionally, the relatively finer lower average grain size may improve the bond between the superhard table 208 and the substrate 222. The average grain size of the upper layer 240 may exhibit any of the disclosed grain sizes or diamond particle sizes, and the lower layer 242 may exhibit any of the disclosed grain sizes or diamond particle sizes, without limitation.

In an embodiment, at least one additional material may be added to the upper layer 240 and/or the lower layer 242. The additional material may include tungsten particles, tungsten carbide particles, sintered cemented tungsten carbide particles, cobalt, iron, nickel, boron, combinations thereof, or any other suitable material. The additional material may be present in the upper layer 240 and/or lower layer 242 in an amount of about 1 weight % to about 20 weight %, such as about 1 weight % to about 10 weight %, or about 5 weight % to about 15 weight %. For example, the additional material may include a mixture of about 1 weight % to about 3 weight % cobalt and about 0.1 weight % to about 0.5 weight % boron. In some embodiments, only one of the upper layer 240 or the lower layer 242 may include the additional material while the other layer is substantially free of the additional material. In other embodiments, a small amount of the additional material may migrate from a layer that includes the additional material to a layer that does not include the additional material. Examples of PDCs including a PCD table having more than one layer that may be used for the PDCs of the tilting pads disclosed herein are disclosed in U.S. Pat. No. 8,727,046, the disclosure of which is incorporated herein, in its entirety, by this reference.

In an embodiment, an interface (e.g., interface 244) between the upper layer 240, the lower layer 242, and/or the at least one intermediate layer may be substantially planar. For example, the superhard table 208 may include an interface 244 between the upper layer 240 and the lower layer 242. The interface 244 may be substantially planar and may be substantially parallel to at least a portion of (e.g., the entirety of) at least one of the superhard bearing surface 210 or the lower surface 212. Alternatively, the interface 244 between the upper layer 240 and the lower layer 242 may be nonplanar and/or may be substantially nonparallel relative to at least a portion of (e.g., the entirety of) superhard bearing surface 210 and/or the lower surface 212. The nonparallel interface 244 may cause the thickness of the upper layer 240 (measured from the superhard bearing surface 210 to the interface 244) and/or the thickness of the lower layer 242 (measured from the interface 244 to the lower surface 212) to vary. The thickness of the upper layer 240 and the thickness of the lower layer 242 may be selected or designed depending on the application of the thrust-bearing assembly 200. For example, certain portions of the superhard bearing surface 210 may be more prominent than other portions of the superhard bearing surface 210. Portions of the upper layer 240 immediately below more prominent portions of the superhard bearing surface 210 may be thicker than other portions of the upper layer 240.

In another embodiment, at least a portion of (e.g., an entirety of) an interface between the upper layer 240, the lower layer 242, and/or the at least one intermediate layer may be substantially nonplanar. For example, the superhard table 208 may include an interface 244 between the upper layer 240 and the lower layer 242. The interface 244 between the upper layer 240 and the lower layer 242 may exhibit a generally concave (relative to the superhard bearing surface 310) or convex spherical geometry, or a generally concave or convex cylindrical geometry. Alternatively, the interface 244 between the upper layer 240 and the lower layer 242 may exhibit generally concave or convex conical geometry, a generally stepped geometry, generally ellipsoid geometry, or another other suitable geometry. Such a nonplanar interface 244 may enable the superhard table 208 to include portions exhibiting a relatively thick upper layer 240 and/or include portions exhibiting a relatively thick lower layer 242.

In an embodiment, the upper layer 240 may only extend from a portion of the superhard bearing surface 210. In such an embodiment, the lower layer 242 and/or the at least one intermediate layer may extend from a portion of the lower surface 212 to a portion of the superhard bearing surface 210. For example, the upper layer 240 may exhibit a generally annular cross-sectional geometry. In an embodiment, the upper layer 240 may extend from a portion of the superhard bearing surface 210 and the at least one peripheral surface 214 towards the lower surface 212.

In an embodiment, at least one of the superhard bearing elements 220 comprises a PDC. The PDC includes a PCD table bonded to a substrate 222. The PDC may be formed by positioning a plurality of first diamond particles adjacent to substrate 222 and a plurality of second diamond particles adjacent to the first diamond grains, thereby forming an assembly. The substrate 222 may include any of the substrates disclosed herein. The first diamond particles may exhibit a first pre-sintered average particle size and the second diamond particles may exhibit a second pre-sintered average particle size. In an embodiment, the first pre-sintered average particle size may be at least 2 times the size of the second pre-sintered average particle size. The assembly may be subjected to an HPHT process similar to any of the HPHT processes disclosed herein. The HPHT process may sinter the first diamond particles to form the lower layer 242, sinter the second diamond particles to form the upper layer 240, bond the lower layer 242 to the upper layer 240, and bond the lower layer 242 to the substrate 222. The upper layer 240 exhibits an upper average grain size and the lower layer 242 exhibits a lower average grain size that is at least 2 times the size of the upper average grain size. In some embodiments, the upper average grain size and the lower average grain size may be different than the second pre-sintered average particle size and the first pre-sintered average particle size, respectively. In some embodiments, the PCD table may be further processed to form a thermally-stable PCD table (e.g., an at least partially leached PCD table).

In an embodiment, the upper layer 240 and the lower layer 242 may be formed in separate processes (e.g., preformed). For example, the upper layer 240 may include a PCD table formed in a first HPHT process and the lower layer 242 may include a PCD table formed in a second HPHT process. The lower layer 242 may be bonded to the substrate 222 during the second HPHT process or may be bonded to the substrate 222 in a subsequent step. The upper layer 240 may then be bonded to the lower layer 242 in a third HPHT process, a brazing process, during the second HPHT process, or another suitable attachment process.

Figure 3A:
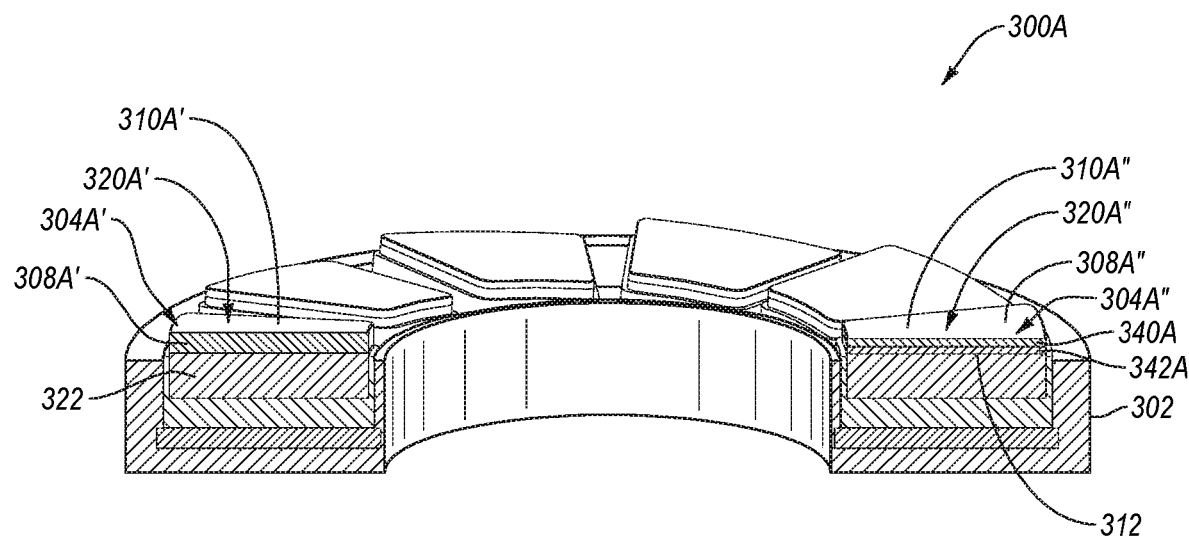
FIG. 3A is an isometric cutaway view of a tilting pad thrust-bearing assembly, according to an embodiment.

FIG. 3A is an isometric cutaway view of a tilting pad thrust-bearing assembly 300A, according to an embodiment. Except as otherwise disclosed herein, the thrust-bearing assembly 300A may be substantially similar to the thrust-bearing assembly 100, shown in FIGS. 1A-2. For example, the thrust-bearing assembly 300A includes a support ring 302. The thrust-bearing assembly 300A also includes a plurality of first tilting pads 304A' and a plurality of second tilting pads 304A". The first tilting pads 304A' and the second tilting pads 304A" may be tilted and/or tiltably secured to the support ring 302.

The first tilting pads 304A' may be substantially similar to the tilting pads 104 shown in FIGS. 1A-1D. For example, the first tilting pads 304A' may each include a superhard bearing element 320A' that includes a relatively thick superhard table 308A' exhibiting a thickness (e.g., maximum thickness) that is at least about 0.120 inch. The relatively thick superhard table 308A' may exhibit an average grain size that is substantially uniform throughout. The superhard table 308A' may be bonded to a substrate 322 and define a superhard bearing surface 310A'. Each superhard bearing element 320A' may be configured to more efficiently dissipate heat from a superhard bearing surface 310A' of the superhard table 308A'.

The second tilting pads 304A" may be substantially similar to the tilting pads 204 shown in FIG. 2. For example, each of the second tilting pads 304A" may include a superhard bearing element 320A" that includes a superhard table 308A". The superhard table 308A" includes at least two layers, such as an upper layer 340A that extends from at least a portion of a superhard bearing surface 310A towards a lower surface 312 of the superhard table 308A" and a lower layer 342A that extends from the lower surface 312 towards the superhard bearing surface 310A". In an embodiment, the upper layer 340A may exhibit an upper average grain size and the lower layer 342A may exhibit a lower average grain size that is at least 2 times the size of the upper average grain size. As such, the upper layer 340A may exhibit at least one of improved abrasion resistance, thermal resistance, and impact resistance. Optionally, the lower layer 342A may exhibit at least one of improved toughness or bonding between the lower layer 342A and a substrate 322.

In some embodiments, the first tilting pads 304A' and the second tilting pads 304A" may improve the performance and/or life expectancy of the thrust-bearing assembly 300A. For example, during normal operation, the thrust-bearing assembly 300A may operate at sufficiently high rotation speeds and/or sufficiently low loads that enable a fluid film to form between the superhard bearing surfaces 310A' and 310A" and an opposing bearing surface. The relatively thick superhard tables 308A' of the first tilting pads 304A' may maintain and thicken the fluid film between the bearing surfaces, thereby improving the performance and/or life expectancy of the thrust-bearing assembly 300A during hydrodynamic conditions. However, during start-ups and shut-downs of a system employing the thrust-bearing assembly 300A, the superhard bearing surfaces 310A' and 310A" may contact opposing bearing surfaces. As such, the improved abrasion resistance, thermal resistance, and/or impact resistance of the second tilting pads 304A" and the improved heat dissipation of the first tilting pads 304A' may improve the performance and/or life expectancy of the thrust-bearing assembly 300A.

In an embodiment, the thrust-bearing assembly 300A may be modified to include a plurality of third tilting pads (not shown). In some embodiments, the third tilting pads may replace at least some of (e.g., all of) the first tilting pads 304A'. In other words, the thrust-bearing assembly 300A may only include a plurality of second tilting pads 304A" and a plurality of third tilting pads. The third tilting pads may be substantially similar to the first tilting pads 304A' except that the third tilting pads include a relatively thin superhard table exhibiting a thickness (e.g., maximum thickness) that is less than about 0.120 inch (e.g., less than about 0.080 inch). Additionally, in some embodiments, the third tilting pads may exhibit an average grain size that is substantially uniform throughout. The third tilting pads may cost less and/or may be easier to manufacture than the first tilting pads 304A'.

Figure 3B:
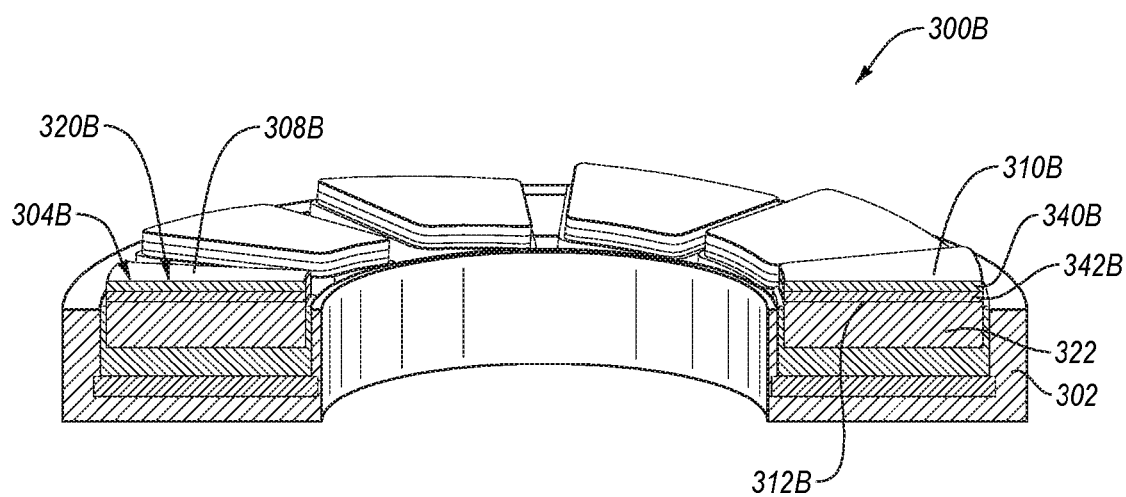
FIG. 3B is an isometric cutaway view of a tilting pad thrust-bearing assembly, according to an embodiment.

FIG. 3B is an isometric cutaway view of a tilting pad thrust-bearing assembly 300B, according to an embodiment. The tilting pad thrust-bearing assembly 300B may be substantially similar to the thrust-bearing assembly 100 shown in FIGS. 1A-1B. For example, the thrust-bearing assembly 300B may include a plurality of tilting pads 304B tilted and/or tiltably secured to the support ring 302. Each tilting pad 304B may include a superhard bearing element 320B that includes a superhard table 308B. The superhard table 308B includes a superhard bearing surface 310B and a lower surface 312B that generally opposes the superhard bearing surface 310B. In some embodiments, the superhard bearing elements 320B may include a substrate 322 bonded to the superhard table 308B (e.g., a PCD table bonded to the substrate 322).

At least some of the superhard bearing elements 320B may include a superhard table 308B exhibiting a thickness (e.g., maximum thickness) that is at least about 0.120 inch. Additionally, such superhard tables 308B may include at least two layers, such as an upper layer 340B extending from the superhard bearing surface 310B towards the lower surface 312B and a lower layer 342B extending from the lower surface 312B towards the superhard bearing surface 310B (e.g., to the upper layer 340B).

At least some of (e.g., all of) the superhard bearing elements 320B of the thrust-bearing assembly 300B may include a superhard table 308B having a thickness that is at least about 0.120 inch and at least two layers. Such a thrust-bearing assembly 300 may exhibit improved the performance and/or life expectancy compared to other thrust-bearing assemblies. For example, a tilting pad 304B including a superhard table that includes a thickness that is at least about 0.120 inch and at least two layers may exhibit increased heat dissipation; better fluid films between the superhard bearing surface 310B and an opposing bearing surface; at least one of improved abrasion resistance, thermal resistance, impact resistance, or toughness; improved bonding between the lower surface 312B and a surface (e.g., a surface of the substrate 322); or combinations thereof. One or more of these properties may increase the performance and/or life expectancy of the tilting pad 304B to thereby increase the performance and/or life expectancy of the thrust-bearing assembly 300B.

In some embodiments, the thrust-bearing assembly 300B may include a plurality of additional tilting pads (not shown) that do not exhibit a thickness that is at least about 0.120 inch and/or that do not include at least two layers. For example, the additional tilting pads may be substantially similar to at least one of the tilting pad 104 shown in FIGS. 1A-1D, tilting pad 104B shown in FIG. 1E, or tilting pad 204 shown in FIG. 2. The additional tilting pads may be relatively cheaper, easier to manufacture, or may include one or more additional feature that improves the performance thereof without being configured similar to the tilting pads 304B.

In an embodiment, the thrust-bearing assembly 300B may include at least a first region that consists of tilting pads 304B that exhibit a thickness that is about 0.120 inch and include at least two layers, and a second region that consists of any differently configured tilting pads (e.g., additional tilting pads as described above). For example, the first region may be more prominent that the second region. In an embodiment, the thrust-bearing assembly 300B may include a plurality of tilting pads 304B exhibiting a thickness that is about 0.120 inch and at least two layers and any of the additional tilting pads interspersed with each other. Such a configuration may improve performance and/or life expectancy of the tilting pads 304B compared to a thrust-bearing assembly 300B that includes only the additional tilting pads.

Figure 4A:
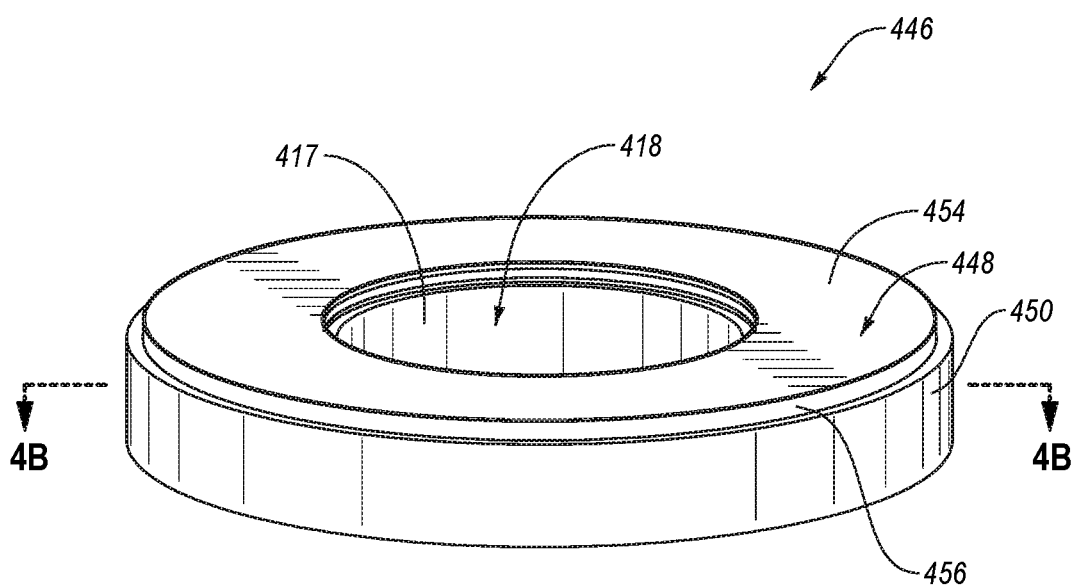
FIGS. 4A and 4B are isometric and isometric cutaway views, respectively, of an opposing thrust-bearing assembly including a substantially continuous bearing element, according to an embodiment.
Figure 4B:
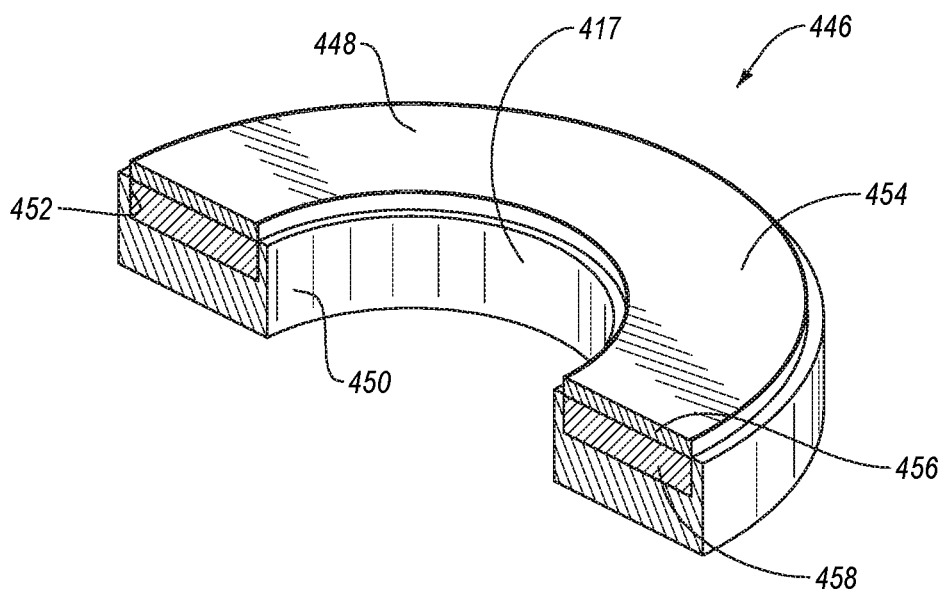

FIGS. 4A and 4B are isometric and isometric cutaway views, respectively, of an opposing thrust-bearing assembly 446 including a substantially continuous bearing element 448, according to an embodiment. The thrust-bearing assembly 446 may include a support ring 450 having an inner peripheral surface 417 defining a hole 418 through which a shaft (not shown) may extend. The support ring 450 may be made from the same materials as the support ring 102 provided in FIG. 1A. The support ring 450 may include an annular slot 452 (FIG. 4B) configured to receive a corresponding substantially continuous bearing element 448.

The substantially continuous bearing element 448 may be attached to the support ring 450 in a fixed position. For example, the substantially continuous bearing element 448 is at least partially received by the annular slot 452 and mounted to the support ring 450. The substantially continuous bearing element 448 may be secured at least partially within the annular slot 452 of the support ring 450 by brazing, press-fitting, welding, using an adhesive, using mechanical fasteners, using another suitable technique, or combinations of the foregoing.

The substantially continuous bearing element 448 includes a substantially continuous bearing surface 454. The substantially continuous bearing surface 454 may comprise a superhard material (e.g., a material having hardness greater than tungsten carbide), a non-superhard material (e.g., a material having a hardness less than tungsten carbide), or combinations thereof. For example, the substantially continuous bearing element 448 may comprise a superhard table 456 (e.g., an unleached or an at least partially leached PCD table) bonded to a substrate 458.

In an embodiment, the substantially continuous bearing element 448 may be formed from a single element (e.g., a continuous bearing element having a continuous bearing surface). In an embodiment, the substantially continuous bearing element 448 may include a plurality of bearing elements that collectively form the substantially continuous bearing element 448 (e.g., a substantially continuous bearing element having a substantially continuous bearing surface). In an embodiment, the thrust-bearing assembly 446 may include a plurality of circumferentially spaced bearing elements (e.g., sliding bearing elements) instead of the substantially continuous bearing element 448. Examples of substantially continuous bearing elements that include a plurality of bearing elements that may be used in combination with tilting pad bearing apparatuses disclosed herein are disclosed in U.S. Pat. No. 7,896,551. The disclosure U.S. Pat. No. 7,896,551 is incorporated herein, in its entirety, by this reference.

Figure 5A:
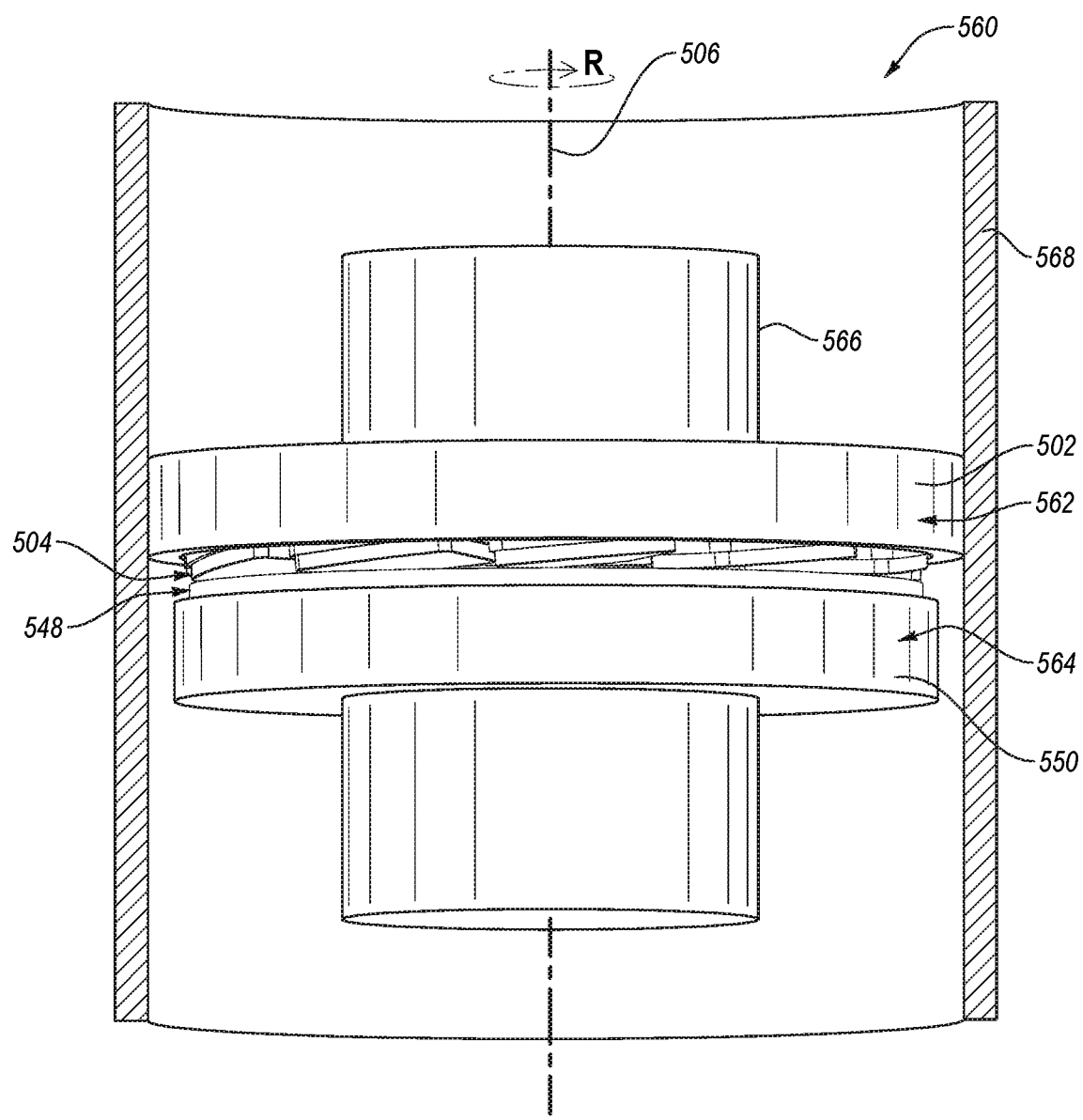
FIGS. 5A and 5B are isometric cutaway and side cross-sectional views, respectively, of a thrust-bearing apparatus, according to an embodiment.
Figure 5B:
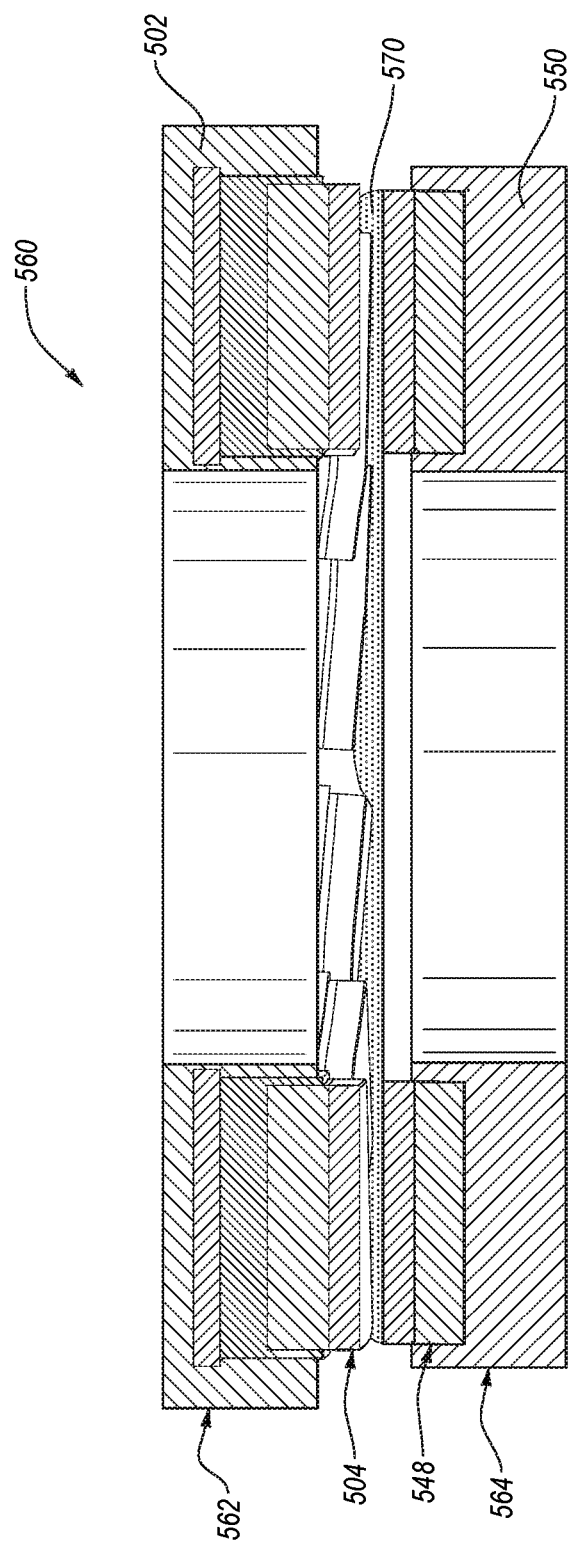

FIGS. 5A and 5B are isometric cutaway and side cross-sectional views, respectively, of a thrust-bearing apparatus 560, according to an embodiment. The thrust-bearing apparatus 560 may include a thrust-bearing assembly that forms a stator 562 and another bearing assembly that forms a rotor 564. In the illustrated embodiment, the stator 562 includes a tilting-pad thrust-bearing assembly (e.g., the tilting pad thrust-bearing assembly 100, 100', 200, 300A, or 300B) and the rotor 564 includes an opposing thrust-bearing assembly (e.g., the opposing thrust-bearing assembly 446). The terms "rotor" and "stator" refer to rotating and stationary components of the thrust-bearing apparatus 560, respectively, although the rotating and stationary status of the illustrated embodiment may also be reversed.

The stator 562 may include a support ring 502 and a plurality of tilting pads 504 mounted or otherwise attached to the support ring 502. The tilting pads 504 may include any of the tilting pads or tilting pad features disclosed herein (e.g., the tilting pads 104, 104A, 104B, 204, 304A', 304A", 304B, etc.). For example, at least some of the tilting pads 504 may exhibit a thickness (e.g., maximum thickness) that is about 0.120 inch and/or at least two layers. Each of the tilting pads 504 may be tilted and/or tilt relative to a rotational axis 506 of the thrust-bearing apparatus 560 and/or one or more surfaces of the support ring 502. The tilting pads 504 may be fixed at a particular tilt, may be manually adjusted to exhibit a particular tilt, may self-establish at a particular tilt, or may be otherwise configured.

The rotor 564 may include a support ring 550 and a substantially continuous bearing element 548 mounted or otherwise secured to the support ring 550 (e.g., as described with respect to FIGS. 4A and 4B). The substantially continuous bearing element 548 includes a substantially continuous bearing surface. The substantially continuous bearing surface is positioned generally adjacent to the superhard bearing surfaces (not shown) of the tilting pads 504. A fluid film 570 (FIG. 5B) may develop between the substantially continuous bearing surface and the superhard bearing surface of the tilting pads 504. The substantially continuous bearing surface may be formed from the same materials as the substantially continuous bearing surface 454 provided in FIGS. 4A and 4B.

As shown in FIG. 5A, a shaft 566 may be coupled to the support ring 550 and operably coupled to an apparatus (e.g., a down hole drilling motor, not shown) capable of rotating the shaft 566 in a direction R (or in an opposite direction). For example, the shaft 566 may extend through and may be secured to the support ring 550 of the rotor 564 by press-fitting or a threaded connection that couples the shaft 566 to the support ring 550, or by using another suitable technique. A housing 568 may be secured to the support ring 502 of the stator 562 by, for example, press-fitting or threadly coupling the housing 568 to the support ring 502, and may extend circumferentially about the shaft 566, the stator 562, and the rotor 564.

The operation of the thrust-bearing apparatus 560 is discussed in more detail with reference to FIG. 5B. FIG. 5B is a side cross-sectional view in which the shaft 566 and housing 568 are not shown for clarity. In operation, lubrication fluid, drilling fluid, drilling mud, other fluid, or combinations thereof may flow between the shaft 566 and the housing 568, and between the tilting pads 504 and the substantially continuous bearing element 548. More particularly, rotation of the rotor 564 at a sufficiently high rotation speeds and/or sufficiently low thrust-loads may allow a fluid film 570 to develop between the bearing surfaces of the tilting pads 504 and the substantially continuous bearing surface. The fluid film 570 may develop under certain operational conditions in which the rotation speed of the rotor 564 is sufficiently great and the thrust-load is sufficiently low.

Under certain operational conditions, the pressure of the fluid film 570 may be sufficient to substantially prevent contact between the superhard bearing surfaces of the tilting pads 504 and the substantially continuous bearing surface and thus, may substantially reduce wear of the continuous bearing surface and the superhard bearing surfaces of the tilting pads 504. When the thrust loads exceed a certain value and/or the rotation speed of the rotor 564 is reduced, the pressure of the fluid film 570 may not be sufficient to substantially prevent the bearing surfaces of the tilting pads 504 and the substantially continuous bearing surface from contacting each other. Under such operational conditions, the thrust-bearing apparatus 560 is not operated as a hydrodynamic bearing. Thus, under certain operational conditions, the thrust-bearing apparatus 560 may be operated as a hydrodynamic bearing apparatus and under other conditions the thrust-bearing apparatus 560 may be operated so that the superhard bearing surfaces of the tilting pads 504 and the continuous bearing element 548 contact each other during use. As such, the superhard bearing surfaces of the tilting pads 504 and/or substantially continuous bearing surface may comprise superhard materials that are sufficiently wear-resistant to accommodate repetitive contact with each other, such as during start-up and shut-down of a system employing the thrust-bearing apparatus 560 or during other operational conditions not favorable for forming the fluid film 570.

Figure 6:
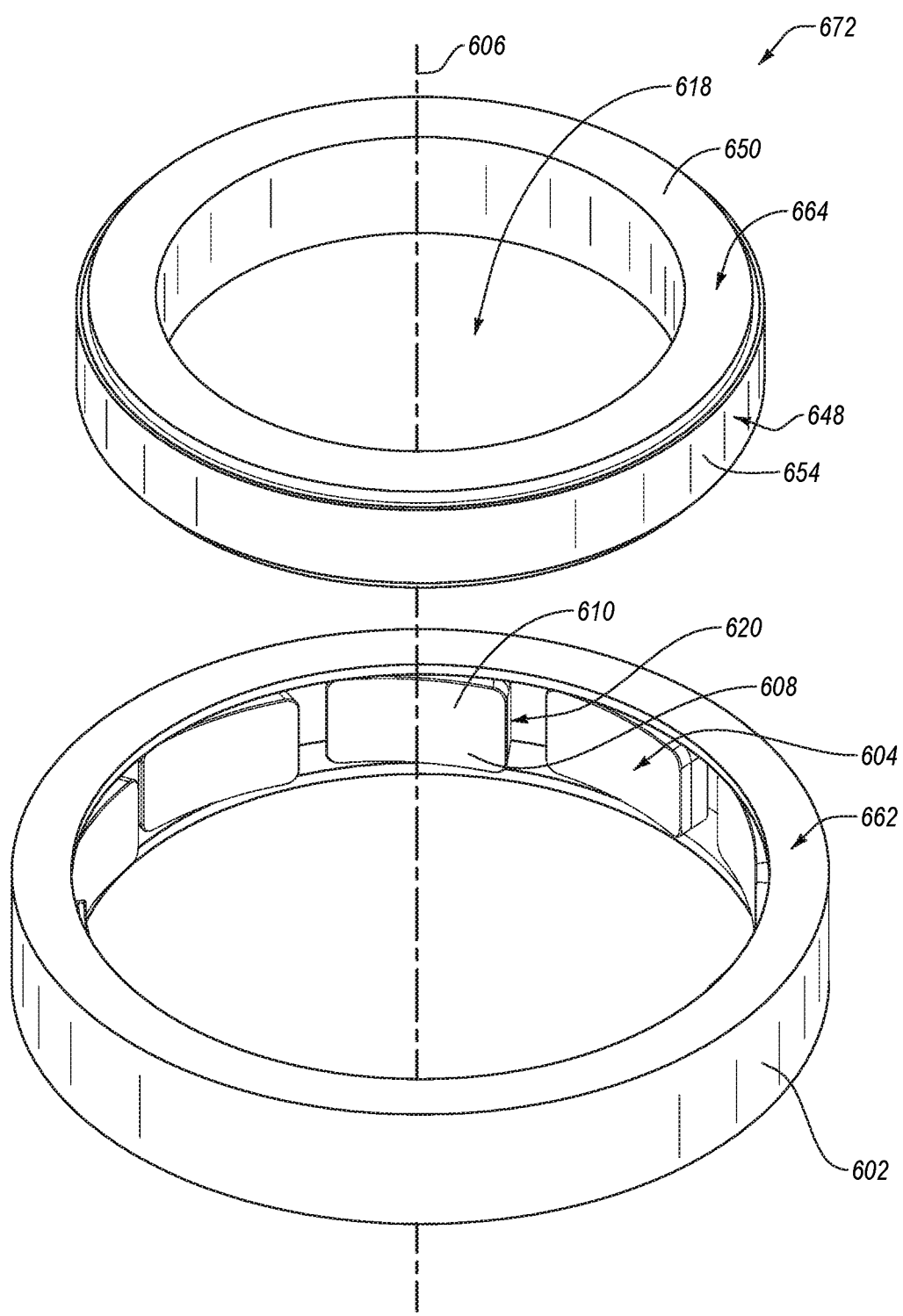
FIG. 6 is an exploded isometric view of a radial bearing apparatus, according to an embodiment.

The concepts used in the thrust-bearing assemblies and apparatuses described herein may also be employed in radial bearing assemblies and apparatuses. FIG. 6 is an exploded isometric view of a radial bearing apparatus 672, according to an embodiment. The radial bearing apparatus 672 may include an inner race 664 (e.g., a runner or rotor). The inner race 664 may include a support ring 650. The support ring 650 may include an inner peripheral surface defining an hole 618 for receiving a shaft (not shown). The inner race 664 may also include a substantially continuous bearing element 648 mounted to the support ring 650. The substantially continuous bearing element 648 may include a convexly-curved substantially continuous bearing surface 654 and may be formed from any of the materials previously discussed for use with the substantially continuous bearing element 448. The support ring 650 of the inner race 664 may include a circumferentially extending recess (not shown) that receives the substantially continuous bearing element 648. The continuous bearing element 648 may be secured within the recess or otherwise secured to the support ring 650 by brazing, press-fitting, using fasteners, or another suitable technique. Alternatively, the inner race 664 may include a plurality of bearing elements (e.g., sliding bearing elements) secured to the support ring 650 instead of the continuous bearing element 648.

The radial bearing apparatus 672 may further include an outer race 662 (e.g., a stator) configured to extend about and/or receive the inner race 664. The outer race 662 may include a support ring 602 extending about a rotation axis 606. The outer race 662 may include a plurality of circumferentially-spaced tilting pads 604. The tilting pads 604 may include any of the tilting pads or tilting pad features disclosed herein (e.g., tilting pads 104, 104A, 104B, 204, 304A', 304A", 304B, etc.). For example, the tilting pads 604 may include a superhard bearing element 620 that includes a superhard table 608 defining a superhard bearing surface 610. At least some of the superhard tables 608 may include a thickness (e.g., maximum thickness) that is at least about 0.120 inch and/or two or more layers. Each of the superhard bearing surfaces 610 may be substantially planar, although in other embodiments, each of the superhard bearing surfaces 610 may be a concavely-curved to generally correspond to the shape of convexly-curved substantially continuous bearing surface 654. Each tilting pad 604 may be tilted in a manner that facilies sweeping in of a lubricant or other fluid to form the fluid film between the inner race 664 and the outer race 662. Each tilting pad 604 may be tilted and/or tilt about an axis that is generally parallel to the rotation axis 606. As a result, each tilting pad 604 may be tilted at an angle relative to the inner and outer surfaces of the support ring 602 and in a circumferential fashion such that the leading edges of the tilting pads 604 are about parallel to the axis 606.

Rotation of a shaft (not shown) secured to the inner race 664 may affect rotation of the inner race 664 relative to the outer race 662. Drilling fluid or other fluid or lubricant may be pumped between the superhard bearing surfaces 610 and the substantially continuous bearing surface 654. As previously described with respect to the tilting pad thrust-bearing apparatus 560, at a fluid film may develop between the superhard bearing surfaces 610 and the substantially continuous bearing surface 654, and may develop sufficient pressure to maintain the superhard bearing surfaces 610 and the substantially continuous bearing surface 654 apart from each other. Accordingly, wear on the superhard bearing surfaces 610 and the substantially continuous bearing surface 654 may be reduced compared to when direct contact between superhard bearing surfaces 610 and the substantially continuous bearing surface 654 occurs. It should be noted that in other embodiments, the radial bearing apparatus 672 may be configured as a journal bearing. In such an embodiment, the inner race 664 may be positioned eccentrically relative to the outer race 662.

Figure 7:
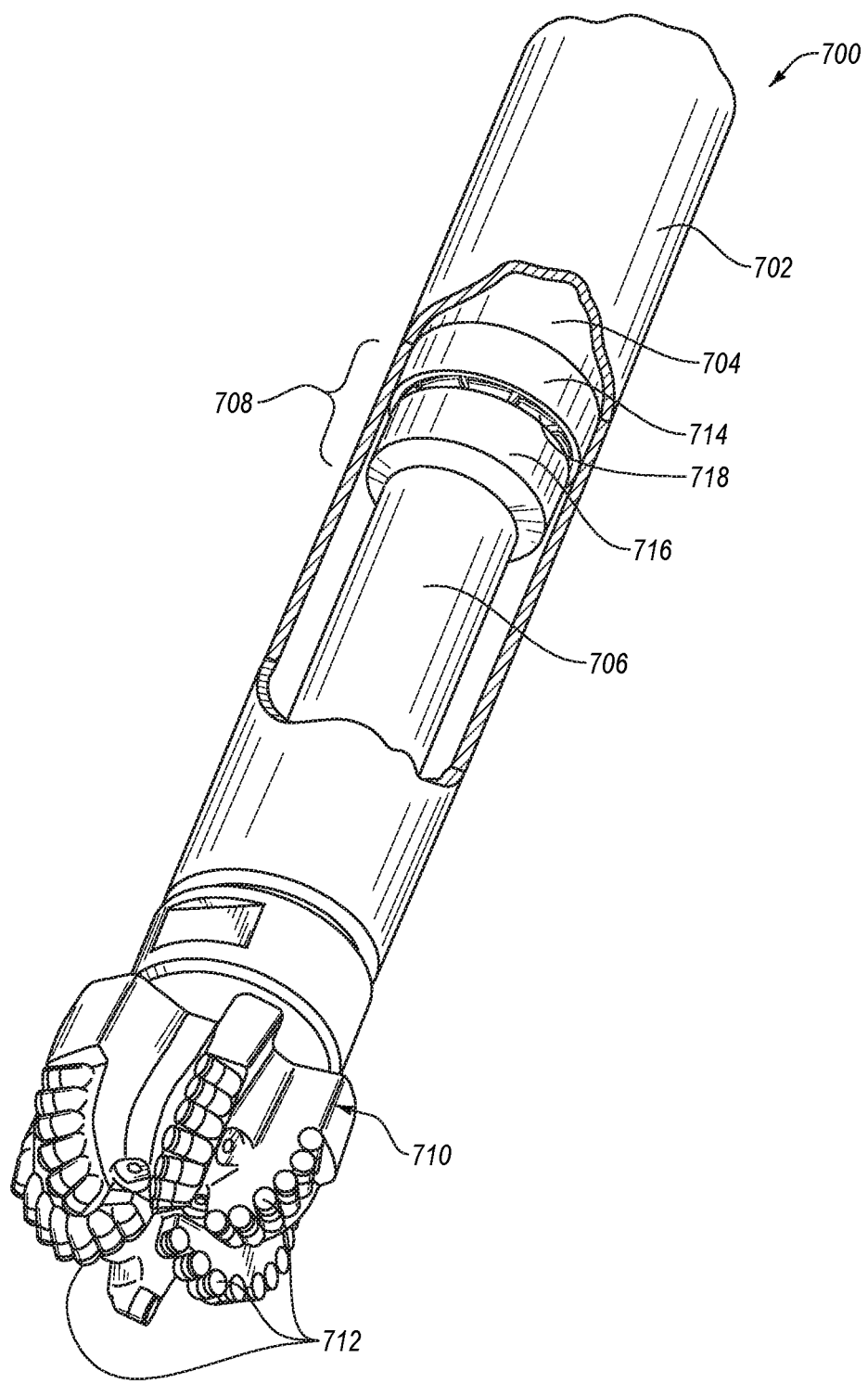
FIG. 7 is a schematic isometric cutaway view of a subterranean drilling system that employs any of the bearing apparatuses disclosed herein, according to an embodiment.

Any of the embodiments for bearing apparatuses discussed above may be used in a subterranean drilling system. FIG. 7 is a schematic isometric cutaway view of an embodiment of a subterranean drilling system 700 according to an embodiment that uses a thrust-bearing apparatus. The subterranean drilling system 700 includes a housing 702 enclosing a downhole drilling motor 704 (i.e., a motor, turbine, or any other device capable of rotating an output shaft) that is operably connected to an output shaft 706. A thrust-bearing apparatus 708 is operably coupled to the downhole drilling motor 704. The thrust-bearing apparatus 708 may be configured as any of the previously described thrust-bearing apparatus embodiments. A rotary drill bit 710 configured to engage a subterranean formation and drill a borehole is connected to the output shaft 706. The rotary drill bit 710 is shown as so-called "fixed cutter" drill bit including a plurality of blades having a plurality of PDC cutting elements 712 mounted thereon. However, in other embodiments, the rotary drill bit 710 may be configured as a roller cone bit including a plurality of roller cones.

The thrust-bearing apparatus 708 includes a stator 714 that does not rotate and a rotor 716 that is attached to the output shaft 706 and rotates with the output shaft 706. The stator 714 may include a plurality of circumferentially spaced tilting pads 718. For example, at least some of the tilting pads 718 may include a superhard table (not shown) that exhibits a thickness (e.g., maximum thickness) that is at least about 0.120 inch and/or at least two layers having different wear and/or thermal characteristics. The rotor 716 may include a substantially continuous bearing element (not shown).

In operation, drilling fluid may be circulated through the downhole drilling motor 704 to generate torque and effect rotation of the output shaft 706 and the rotary drill bit 710 attached thereto so that a borehole may be drilled. A portion of the drilling fluid may be used to lubricate opposing bearing surfaces of the stator 714 and rotor 716. As the borehole is drilled, pipe sections may be connected to the subterranean drilling system 700 to form a drill string capable of progressively drilling the borehole to a greater depth within the earth.

The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

The invention claimed is:

1. A bearing apparatus, comprising
   a first bearing assembly including:
      a first support ring; and
      a substantially continuous bearing element secured to the first support ring, the substantially continuous bearing element including a substantially continuous bearing surface; and
   a second bearing assembly including:
      a second support ring; and
      a plurality of tilting pads distributed circumferentially about the axis and tilted and/or tiltably secured relative to the second support ring, each of the plurality of tilting pads including a superhard table defining a superhard bearing surface, the plurality of tilting pads including at least one first tilting pad, the superhard table of the at least one first tilting pad including polycrystalline diamond exhibiting a thickness that is greater than 0.120 inch.

2. The bearing apparatus of claim 1, wherein the first bearing assembly is a rotor and the second bearing assembly is a stator.

3. The bearing apparatus of claim 1, wherein the substantially continuous bearing element is formed from a single continuous bearing element and the substantially continuous bearing surface is a continuous bearing surface.

4. The bearing apparatus of claim 1, wherein the substantially continuous bearing element includes a plurality of bearing elements that collectively form the substantially continuous bearing element.

5. The bearing apparatus of claim 1, wherein the substantially continuous bearing element includes polycrystalline diamond.

6. The bearing apparatus of claim 1, wherein the substantially continuous bearing element includes at least one of polycrystalline cubic boron nitride, silicon carbide, silicon nitride, tantalum carbide, tungsten carbide, boron carbide, reaction-bonded silicon nitride, or reaction-bonded silicon carbide.

7. The bearing apparatus of claim 1, wherein the thickness of the superhard table of the at least one first tilting is at least 0.156 inch.

8. The bearing apparatus of claim 1, wherein the thickness of the superhard table of the at least one first tilting is at least 0.200 inch.

9. The bearing apparatus of claim 1, wherein the at least one first tilting pad includes a support plate and the superhard table is secured, either directly or indirectly, to the support plate, and wherein the superhard bearing surface extends above a top surface of the support plate by a distance that is equal to or greater than the thickness of the superhard table.

10. The bearing apparatus of claim 9, wherein the distance is greater than about 0.18 inch.

11. The bearing apparatus of claim 1, wherein the superhard table of the at least one first tilting pad includes a lower surface and at least one peripheral surface extending between the superhard bearing surface and the lower surface, the superhard table of the at least one first tilting pad including a lower layer extending from the lower surface towards the superhard bearing surface and an upper layer extending from at least a portion of the superhard bearing surface towards the lower surface, the upper layer exhibiting a higher abrasion resistance than the lower layer.

12. The bearing apparatus of claim 1, wherein the superhard table of the at least one first tilting pad includes a substantially uniform grain size therethrough.

13. The bearing apparatus of claim 1, wherein the plurality of tilting pads include at least one second tilting pad, the superhard table of the at least one second tilting pad including polycrystalline diamond exhibiting a thickness that is less than 0.120 inch.

14. The bearing apparatus of claim 1, wherein the plurality of tilting pads include at least one second tilting pad, the superhard table of the at least one second tilting pad including a lower surface and at least one peripheral surface extending between the superhard bearing surface and the lower surface, the superhard table of the at least one second tilting pad including a lower layer extending from the lower surface towards the superhard bearing surface and an upper layer extending from at least a portion of the superhard bearing surface towards the lower surface, the upper layer exhibiting a higher abrasion resistance than the lower layer.

15. A bearing apparatus, comprising
a rotor including:
   a first support ring; and
   a substantially continuous bearing element secured to the first support ring, the substantially continuous bearing element including a superhard material defining a substantially continuous bearing surface; and
a rotor including:
   a second support ring; and
   a plurality of tilting pads distributed circumferentially about the axis and tilted and/or tiltably secured relative to the second support ring, each of the plurality of tilting pads including a polycrystalline diamond table defining a superhard bearing surface, the polycrystalline diamond table of at least one of the plurality of tilting pads exhibiting a thickness that is greater than 0.200 inch.

16. The bearing apparatus of claim 15, wherein the substantially continuous bearing element is formed from a single continuous bearing element and the substantially continuous bearing surface is a continuous bearing surface.

17. The bearing apparatus of claim 15, wherein the substantially continuous bearing element includes a plurality of bearing elements that collectively form the substantially continuous bearing element.

18. The bearing apparatus of claim 15, wherein the polycrystalline diamond table of the at least one of the plurality of tilting pads includes a lower surface and at least one peripheral surface extending between the superhard bearing surface and the lower surface, the polycrystalline diamond table of the at least one of the plurality of tilting pads including a lower layer extending from the lower surface towards the superhard bearing surface and an upper layer extending from at least a portion of the superhard bearing surface towards the lower surface, the upper layer exhibiting a higher abrasion resistance than the lower layer.

19. The bearing apparatus of claim 15, wherein the substantially continuous bearing element includes at least one of polycrystalline cubic boron nitride, silicon carbide, silicon nitride, tantalum carbide, tungsten carbide, boron carbide, reaction-bonded silicon nitride, or reaction-bonded silicon carbide.

20. The bearing apparatus of claim 15, wherein the superhard table of the at least one of the plurality of tilting pads includes a lower surface and at least one peripheral surface extending between the superhard bearing surface and the lower surface, the superhard table of the at least one of the plurality of tilting pads including a lower layer extending from the lower surface towards the superhard bearing surface and an upper layer extending from at least a portion of the superhard bearing surface towards the lower surface, the upper layer exhibiting a higher abrasion resistance than the lower layer.

21. The bearing apparatus of claim 15, wherein the plurality of tilting pads include at least one second tilting pad, the superhard table of the at least one second tilting pad including polycrystalline diamond exhibiting a thickness that is less than 0.200 inch.

* * * * *